(12) United States Patent　　　(10) Patent No.:　US 12,633,985 B2

Kadambar et al.　　　　　　　　　　(45) Date of Patent:　　May 19, 2026

(54) ARTIFICIAL INTELLIGENCE (AI) BASED CHANNEL STATE INFORMATION (CSI) CODING

(71) Applicant: Samsung Electronics Co., Ltd., Suwon-si (KR)

(72) Inventors: Sripada Kadambar, Karnataka (IN); Ashwini Kumar, Karnataka (IN); Ameha Tsegaye Abebe, Karnataka (IN); Ashok Kumar Reddy Chavva, Karnataka (IN); Pedamalli Saikrishna, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 453 days.

(21) Appl. No.: 18/325,511

(22) Filed: May 30, 2023

(65) Prior Publication Data

US 2024/0405821 A1　　　Dec. 5, 2024

(30) Foreign Application Priority Data

May 30, 2022　　(IN) .............................. 202241030982
　May 11, 2023　　(IN) .............................. 202241030982

(51) Int. Cl.
　　*H04B 7/06*　　　　　(2006.01)
　　*H04W 24/02*　　　　(2009.01)
(52) U.S. Cl.
　　CPC .......... *H04B 7/0626* (2013.01); *H04W 24/02* (2013.01)
(58) Field of Classification Search
　　CPC .... H04B 7/0626; H04B 7/063; H04B 7/0632; H04B 7/0658; H04L 1/0018; H04L

1/0029; H04L 25/024; H04L 41/16; H04W 24/02; H04W 24/04; H04W 24/08; H04W 24/10

See application file for complete search history.

(56)　　　　　References Cited

U.S. PATENT DOCUMENTS

| | | | | |
|---|---|---|---|---|
| 2018/0069734 A1* | 3/2018 | Soriano | .............. | H04L 27/3488 |
| 2023/0359872 A1* | 11/2023 | Lin | ........................ | G06N 3/0455 |
| 2024/0120971 A1* | 4/2024 | Qin | ........................ | H04B 7/0626 |
| 2024/0146582 A1* | 5/2024 | Wang | ..................... | H04L 1/0029 |
| 2025/0285337 A1* | 9/2025 | Galpin | ..................... | G06N 3/02 |
| 2025/0373351 A1* | 12/2025 | O'Shea | ................ | H04B 7/0452 |

* cited by examiner

*Primary Examiner* — Habte Mered
*Assistant Examiner* — Prince A Mensah
(74) *Attorney, Agent, or Firm* — Nixon & Vanderhye, P.C.

(57)　　　　　ABSTRACT

Disclosed is a method performed by a user equipment (UE) for Artificial Intelligence (AI) based Channel State Information (CSI) encoding. The method comprises receiving, a signaling message including at least one encoding parameter from a Base Station (BS), wherein the encoding parameter comprises an AI model. The method comprises segmenting a precoder data based on the signaling message into a plurality of data segments. The method comprises selecting at least one AI model from a plurality of AI models based on the at least one encoding parameter received from the BS. The method comprises encoding each data segment of the plurality of data segments of the precoder data using the at least one selected AI model. The method comprises sending at least one encoded data segment of the precoder data to the BS for decoding.

15 Claims, 19 Drawing Sheets

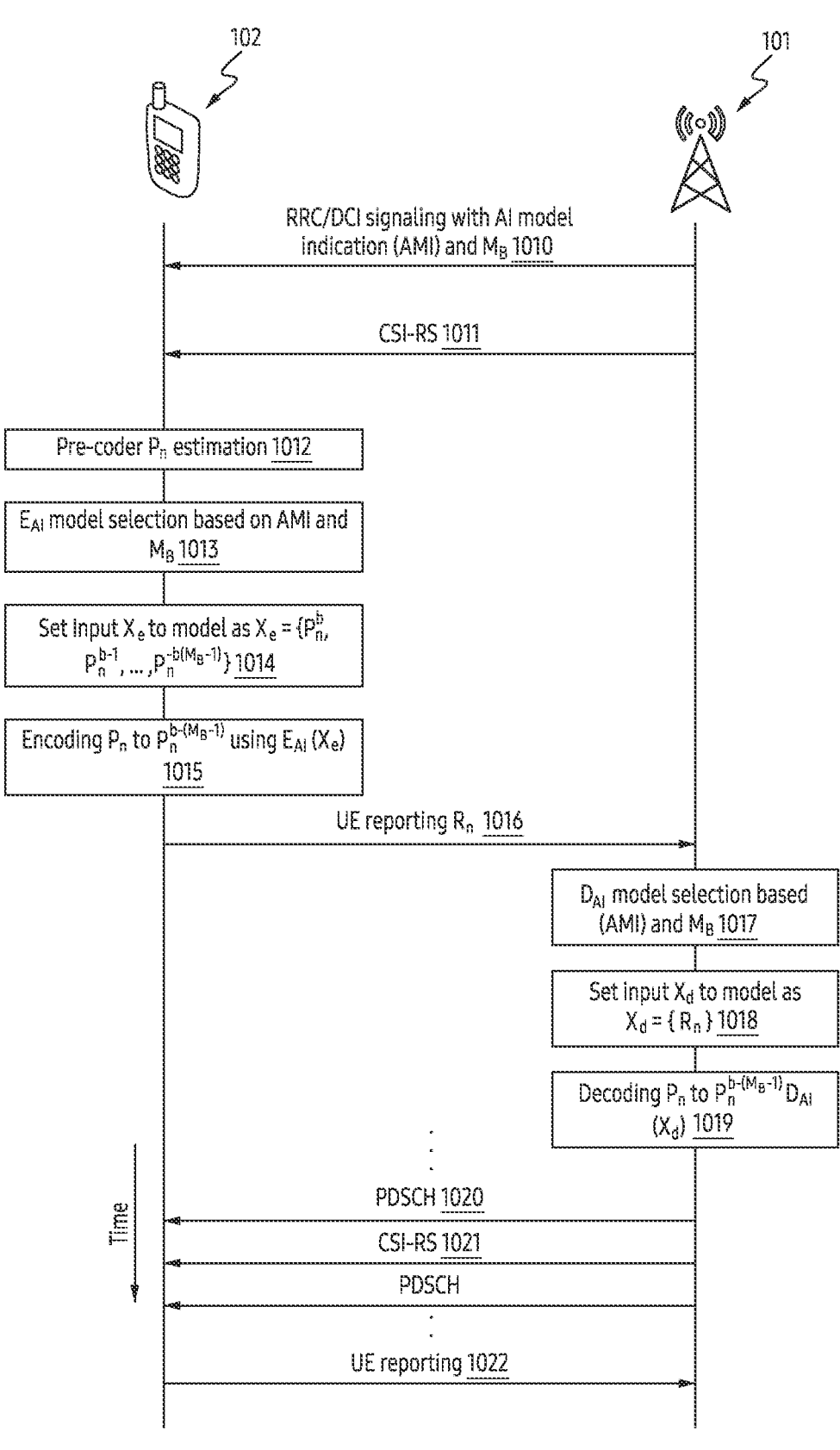

102

101

RRC/DCI signaling with AI model
indication (AMI) and $M_B$ 1010

CSI-RS 1011

Pre-coder $P_n$ estimation 1012

$E_{AI}$ model selection based on AMI and
$M_B$ 1013

Set input $X_e$ to model as $X_e = \{P_n^b,$
$P_n^{b-1}, ..., P_n^{-b(M_B-1)}\}$ 1014

Encoding $P_n$ to $P_n^{b-(M_B-1)}$ using $E_{AI}(X_e)$
1015

UE reporting $R_n$ 1016

$D_{AI}$ model selection based
(AMI) and $M_B$ 1017

Set input $X_d$ to model as
$X_d = \{R_n\}$ 1018

Decoding $P_n$ to $P_n^{b-(M_B-1)} D_{AI}$
$(X_d)$ 1019

Time

PDSCH 1020

CSI-RS 1021

PDSCH

UE reporting 1022

FIG. 10

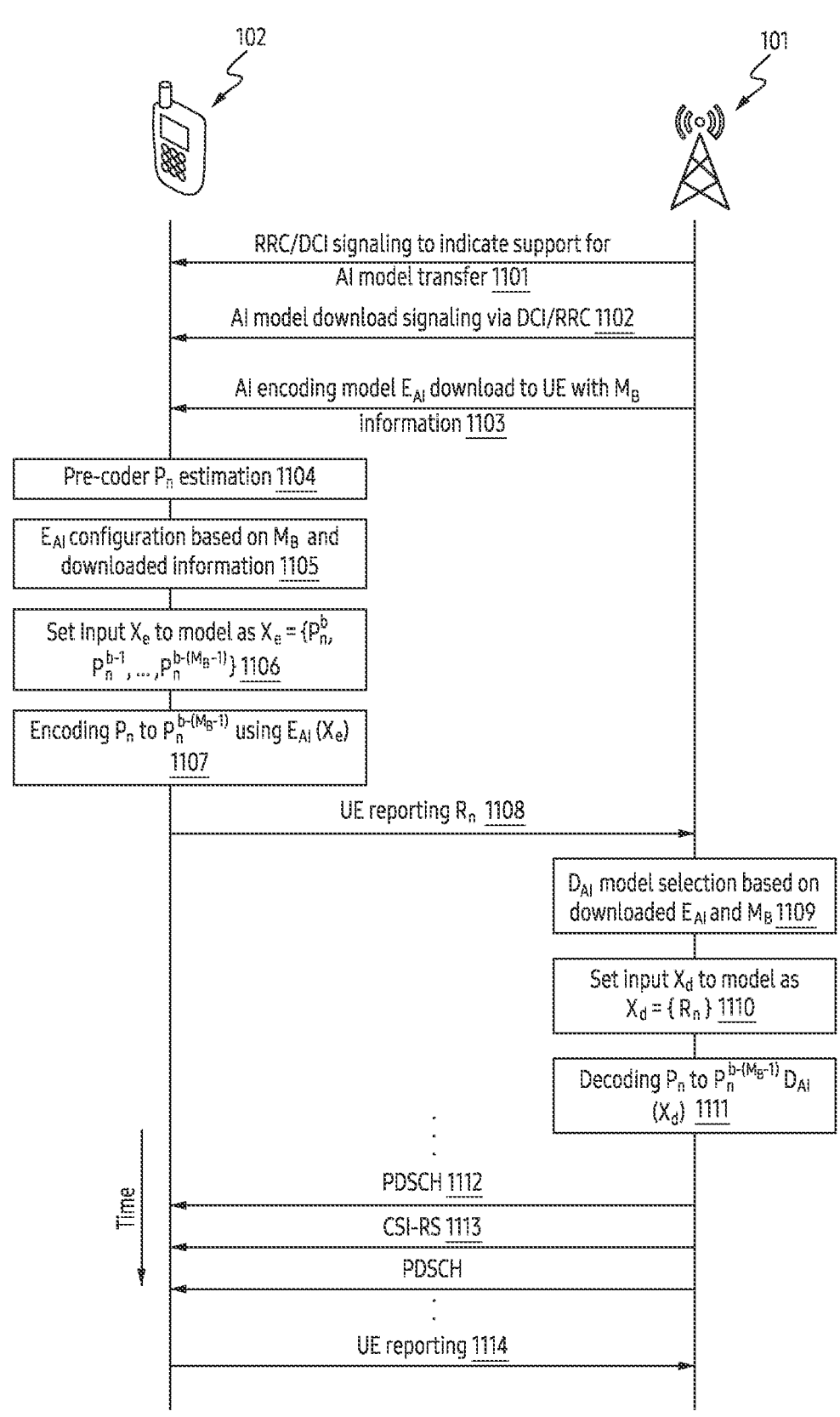

102

101

RRC/DCI signaling to indicate support for
AI model transfer 1101

AI model download signaling via DCI/RRC 1102

AI encoding model $E_{AI}$ download to UE with $M_B$
information 1103

Pre-coder $P_n$ estimation 1104

$E_{AI}$ configuration based on $M_B$ and
downloaded information 1105

Set Input $X_e$ to model as $X_e = \{P_n^b,$
$P_n^{b-1}, \dots, P_n^{b-(M_B-1)}\}$ 1106

Encoding $P_n$ to $P_n^{b-(M_B-1)}$ using $E_{AI}$ $(X_e)$
1107

UE reporting $R_n$ 1108

$D_{AI}$ model selection based on
downloaded $E_{AI}$ and $M_B$ 1109

Set input $X_d$ to model as
$X_d = \{R_n\}$ 1110

Decoding $P_n$ to $P_n^{b-(M_B-1)}$ $D_{AI}$
$(X_d)$ 1111

Time

PDSCH 1112

CSI-RS 1113

PDSCH

UE reporting 1114

FIG. 11

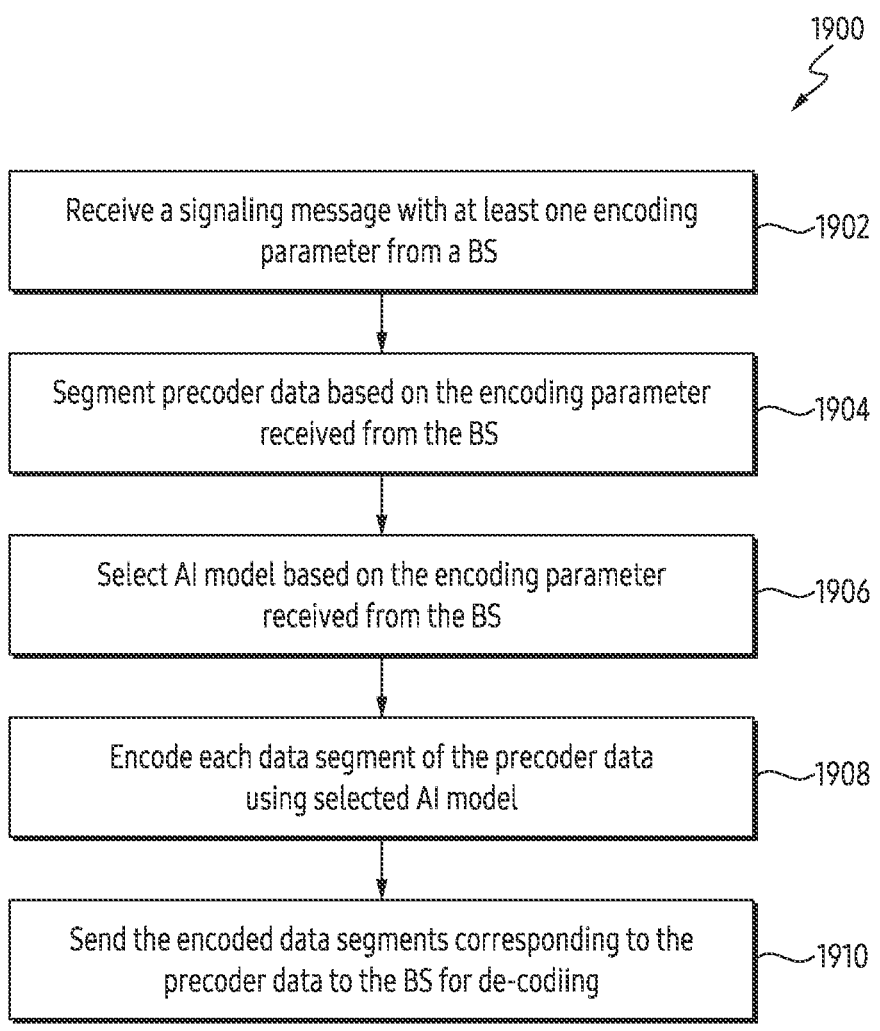

1900

Receive a signaling message with at least one encoding
parameter from a BS — 1902

Segment precoder data based on the encoding parameter
received from the BS — 1904

Select AI model based on the encoding parameter
received from the BS — 1906

Encode each data segment of the precoder data
using selected AI model — 1908

Send the encoded data segments corresponding to the
precoder data to the BS for de-codiing — 1910

FIG. 19

ARTIFICIAL INTELLIGENCE (AI) BASED CHANNEL STATE INFORMATION (CSI) CODING

CROSS-REFERENCE TO RELATED APPLICATIONS

The application is based on and claims priority under 35 U.S.C. § 119 of Indian Provisional Specification application No. 202241030982 filed on May 30, 2022, and to Indian Complete Specification application No. 202241030982, filed on May 11, 2023, in the Indian Patent Office, the disclosures of all of which are incorporated by reference herein in their entireties.

BACKGROUND

Field

The disclosure relates to wireless networks. For example, the disclosure relates to a method, a User Equipment (UE) and a Base station (BS) for Artificial Intelligence (AI) based Channel State Information (CSI) coding.

Description of Related Art

In general, AI systems can be designed to learn from data, improve over time, and adapt to new data. The AI systems can be include two categories, first is a narrow or weak AI and a general or strong AI. The narrow or weak AI is designed to perform a specific task, and the general or strong AI performs cognitive tasks. The AI systems include model structure and weights. The model structures include parameters such as number of layers, type of layers, number of neurons, activation type in each layer, and the like. The weights are values used for combining inputs to produce a layer output.

In an example of an existing system, a Massive Multiple-Input Multiple-Output (m-MIMO) antenna system requires transmitters to obtain accurate CSI. In an implementation, a UE estimates downlink CSI and feeds the CSI back to a BS of a network device. An encoding CSIs and decoding CSIs are used to compress and encode the CSI information in the UE and decode at the BS of the network device. Due to a large number of antennas, the channel matrix in m-MIMO antenna systems is very large making the CSI estimation and feedback very challenging, especially through bandwidth-constrained feedback channels. Further, handling channel fading is difficult due to environmental factors and mobility of the UE. Also, in an existing New Radio (NR) CSI encoding scheme, the UE selects the closest precoder from codebook set and reports the precoder to the BS causing high overhead. Therefore, there is a need for the method to determine the CSI encoding and decoding with reduced overhead.

Thus, it is desired to address the above-mentioned disadvantages or other shortcomings or at least provide a useful alternative.

SUMMARY

Embodiments of the disclosure provide a method and a system for AI based CSI coding. The AI-based CSI coding provides performance enhancement.

Embodiments of the disclosure may use time measurements in a wireless communication network for AI based CSI coding.

Embodiments of the disclosure may use pre-stored models such as weights and structure stored in BS and UE for AI based CSI coding.

Embodiments of the disclosure may use CSI coding using AI model download information indicated by the BS to the UE.

Embodiments of the disclosure may use time measurements and frequency sub-bands in a pre-stored model for CSI based coding.

Embodiments of the disclosure may use the time measurements in a pre-stored model for AI based CSI coding.

Embodiments of the disclosure may use the time measurements in a downloaded model for AI based CSI coding.

Embodiments of the disclosure may use time measurements at the BS using downloaded model as one sided time measurements.

Embodiments of the disclosure may provide AI based CSI coding using frequency sub-band measurements using the pre-stored model.

Embodiments of the disclosure may provide AI based CSI coding for the frequency sub-band measurements using downloaded model.

embodiments of the disclosure may provide AI based CSI coding using time measurements and frequency sub-band measurements.

Embodiments of the disclosure may provide AI based CSI coding for time measurements and frequency sub-band measurements using pre-stored model.

Embodiments of the disclosure may provide AI based CSI coding for historical time measurements and frequency sub-band measurements at the BS as one sided time measurements. Using the sub-band measurements and the time measurements, decoding performance is improvised with high accuracy and high compression ratio with reduced CSI reporting overhead.

Accordingly, an example embodiment herein provides a method for AI based CSI coding comprising receiving a signaling message with encoding parameter from a BS. A precoder data is segmented into a plurality of data segments and the AI model is selected based on the encoding parameter received from the BS. Each data segment of the precoder data is encoded using the selected AI model and the encoded data segments corresponding to the precoder data is transmitted to the BS for decoding.

In an example embodiment, the at least one encoding parameter is an AI model indicator (AMI) for selecting the at least one AI model, a model download message for downloading the at least one AI model, time measurements ($M_t$), frequency sub-band measurements ($M_b$).

In an example embodiment, the encoding parameter is received comprising the AMI performs, receiving the AMI from the BS. The AI model is selected based on the received AMI. Further, the precoder data is segmented into the plurality of data segments. Each data segment of the precoder data is encoded using the selected AI model. The encoded data segments corresponding to the precoder data is sent to the BS for decoding.

In an example embodiment, the encoding parameter includes receiving the AI model download information with at least one encoding parameter from the BS and downloading the at least one AI model received from the BS based on the AI model download information. Further, the method includes segmenting the precoder data into the plurality of data segments to encode each data segment of the plurality of data segments of the precoder data using the at least one downloaded AI model based on the AI model download information and sending the encoded data segments corresponding to the precoder data to the BS for decoding.

In an example embodiment, the precoder data is encoded based on the time measurements, the frequency sub-band measurements, at least one time measurement in which each occasion comprises of CSI measured for at least one frequency sub-band measurements, the AMI for selecting the AI model, the AI model download information for downloading AI model.

In an example embodiment, the CSI encoding includes sending the signaling message with the encoding parameter to the UE and receiving the plurality of data segments corresponding to the encoded precoder data from the UE. Further, the CSI encoding includes selecting the AI model based on the encoding parameter sent to the UE and decoding the encoded data segments corresponding to the precoder data using the selected AI model.

In an example embodiment, the precoder data is encoded by the UE using the AI model based on the encoding parameter sent by the BS or the model download information sent by the BS, and the AI model used to encode the precoder data by the UE is different than the AI model used to decode the encoded data segment corresponding to the precoder data by the BS, and the model download information sent by the BS comprises the AI model to be used for encoding.

Accordingly, an example embodiment herein comprises a UE for AI based CSI encoding. The UE includes a memory, a processor, AI based CSI encoding controller and a precoder estimator configured to receive a signaling message with at least one encoding parameter from the BS and segment the precoder data into the data segments. The UE selects the AI model from the AI models based on the encoding parameter received from the BS and encode the data segment of the precoder data using the selected AI model to send the encoded data segments corresponding to the precoder data to the BS for decoding.

Accordingly, an example embodiment herein discloses a BS for AI based CSI coding. The BS includes a memory, a processor, AI based CSI decoding controller communicatively coupled to the BS and configured to send the signaling message with the encoding parameter to the UE and receive the data segments corresponding to the encoded precoder data from the UE. The BS select AI model from the AI models based on the encoding parameter sent to the UE and decode the encoded data segments corresponding to the precoder data using the selected AI model.

Accordingly, a method performed by a user equipment (UE) for Artificial Intelligence (AI) based Channel State Information (CSI) encoding, comprises receiving, a signaling message including at least one encoding parameter from a Base Station (BS), wherein the encoding parameter comprises an AI model. The method comprises segmenting a precoder data based on the signaling message into a plurality of data segments. The method comprises selecting at least one AI model from a plurality of AI models based on the at least one encoding parameter received from the BS. The method comprises encoding each data segment of the plurality of data segments of the precoder data using the at least one selected AI model. The method comprises sending at least one encoded data segment of the precoder data to the BS for decoding.

Accordingly, a User Equipment (UE) for Artificial Intelligent (AI) based Channel State Information (CSI) encoding, the UE comprises a memory comprising a plurality of AI models and corresponding weight of each of the plurality of AI models. The UE comprises a processor. The processor is configured to receive a signaling message including at least one encoding parameter from a Base Station (BS), wherein the encoding parameter comprises an AI model. The processor is configured to segment a precoder data into a plurality of data segments. The processor is configured to select at least one AI model from a plurality of AI models based on the at least one encoding parameter received from the BS. The processor is configured to encode each data segment of the plurality of data segments of the precoder data using the at least one selected AI model. The processor is configured to send the at least one encoded data segments of the precoder data to the BS for decoding.

Accordingly, a Base Station (BS) for Artificial Intelligent (AI) based Channel State Information (CSI), the BS comprises a memory. The BS comprises a processor. The processor is configured to send a signaling message including at least one encoding parameter to a user equipment (UE), wherein the encoding parameter comprises an AI model. The processor is configured to receive at least one data segment of a precoder data from the UE. The processor is configured to select at least one AI model from a plurality of AI models based on the at least one encoding parameter. The processor is configured to decode the at least one data segments of the precoder data using the at least one selected AI model.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure without departing from the scope thereof, and the embodiments herein include all such modifications.

BRIEF DESCRIPTION OF THE DRAWINGS

The embodiments are illustrated in the accompanying drawings, throughout which like reference letters indicate corresponding parts in the various figures. In addition, the above and other aspects, features and advantages of certain embodiments of the present disclosure will be more apparent from the following detailed description, taken in conjunction with the accompanying drawings, in which:

FIG. 10, is a signal flow diagram illustrating CSI reporting based on frequency sub-bands using a pre-stored model, according to various embodiments;

FIG. 11 is a signal flow diagram illustrating CSI reporting based on frequency sub-bands using downloaded model, according to various embodiments;

FIG. 19 is a flowchart illustrating CSI based coding, according to various embodiments.

DETAILED DESCRIPTION

Figure 1:
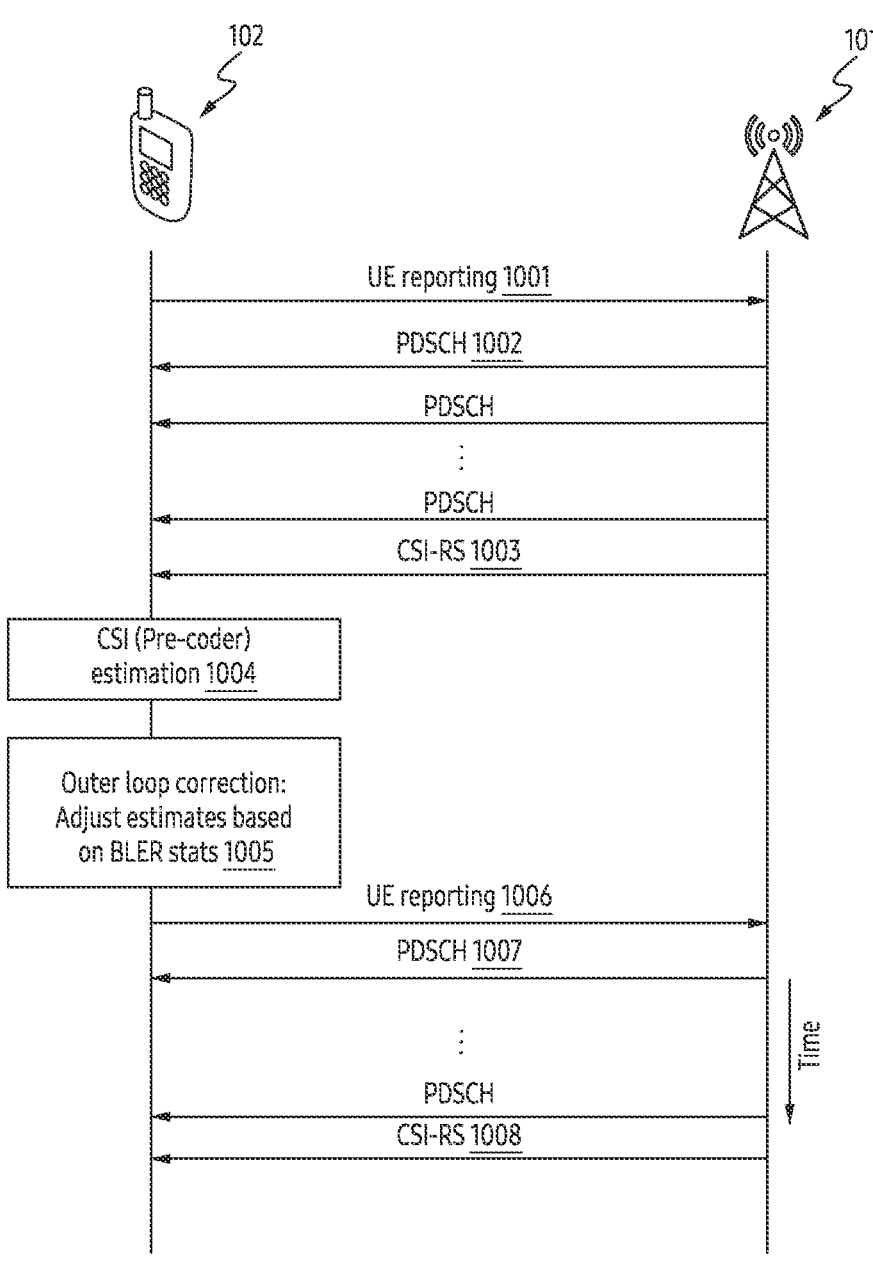
FIG. 1 is a signal flow diagram illustrating a New Radio CSI feedback procedure, according to the prior art.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the disclosure. Also, the various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of the disclosure. Accordingly, the examples should not be construed as limiting the scope of the disclosure.

Various embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for AI based CSI coding by receiving a signaling message with encoding parameter from a BS. The precoder data is segmented into a plurality of data segments and the AI model is selected based on the encoding parameter received from the BS. Each data segment of the precoder data is encoded using the selected AI model and the encoded data segments corresponding to the precoder data is transmitted to the BS for decoding.

In existing methods encoding and mapping for transmission and reception of the CSI is disclosed. In the existing methods the CSI is measured based on configuration information, and the measured CSI is reported to the BS. The CSI includes a first part and a second part. The second part is a precoding matrix indicator: (PMI). Unlike the conventional method, the present disclosure is the AI based coding for NR using signaling messages such as but not limited to PDCHS, CSI-RS, RRC or DCI, AI model indicator (AMI), time measurements ($M_t$), frequency sub-band measurements ($M_b$) and an AI configurations.

FIG. 1 is a signal flow diagram illustrating a New Radio CSI feedback procedure, according to the prior art.

Referring to FIG. 1, the diagram includes a BS (101) and UE (102). The UE (102) can be one or more. The BS (101) is a terminal node of a network that communicates with a terminal. A wireless network can include more than one network node including the BS. The operations of the terminal can be performed by the BS or a network node. The BS (101) can be a fixed station, Node B, eNB (evolved-NodeB), Base Transceiver System (BTS), Access Point (AP), gNB (general). In addition, the terminal can be fixed or mobile, and can be UE (102), Machine Station (MS), user tertiary (UT), Mobile Subscriber Station (MSS), Subscriber Station (SS), Advanced Mobile Station (AMS), Wireless Terminal (WT), Machine-Type Communication (MTC) device, Machine-to-Machine device (M2M).

The following technologies such as, a Code Division Multiple Access (CDMA), a Frequency Division Multiple Access (FDMA), a Time Division Multiple Access (TDMA), an Orthogonal Frequency Division Multiple Access (OFDMA), a Single Carrier Frequency Division Multiple Access (SC-FDMA) can be used for wireless connection systems. The CDMA can be embodied by radio technology (radio technology) such as the UTRA and CDMA. The TDMA is embodied in wireless technology such as global system for mobile communications (GSM)/ general packet radio service (GPRS)/enhanced data rates for GSM evolution (EDGE). The OFDMA can be embodied by wireless technologies such as IEEE 802.11 (WiFi), IEEE 802.16 (WiMAX), IEEE 802-20, and E-UTRA (evolved UTRA). The UTRA is part of UMTS (universal mobile telecommunications system). A third generation partnership project (3GPP) Long Term Evolution (LTE) is a part of evolved UMTS (E-UMTS) that uses E-UTRA, adopts OFDMA in the downlink, and SC-FDMA in the uplink. An LTE-A (advanced) is an evolution of 3GPP LTE.

The NR CSI feedback procedure includes NR CSI link adaptation. The UE (102) transmits a UE reporting signal (as shown at step 1001) to the BS (101). The BS (101) transmit PDSCH (at step 1002) and CSI-RS signal (at step 1003) to the UE (102). The NR CSI link adaption, the UE (102) or an inner loop transmits the UE (102) feedback signal based on CSI Reference Signal (CSI-RS) received from the BS (101). Multiple metrics are estimated by the UE (102) (at step 1004) and report to the BS (101) for effective link adaptation in a MIMO setup. The UE (102) may perform outer loop correction. For example, the UE (102) adjusts estimates based on block error rate (BLER) stats (at step 1005). Further the CSI reporting is performed by the UE (102) to the BS (101). The CSI reporting includes data rate indication and MIMO configuration metrics. The precoding matrix indicator (PMI) is used for MIMO precoder selection. A channel Quality Indicator (CQI) is used for data rate indication.

A resource configuration is used for configuring reference signals for calculating the CSI. The report configuration is used for configuring the behaviour of reporting the CSI. The Radio Resource Control (RRC) layer signalling CSI-reporting configuration IE indicates resources used for channel measurement and interference measurement, and further includes codebook configuration, including Type I, type II, or enhanced Type II codebooks and codebook restriction subsets, and indicates that a periodic manner, a semi-continuous manner based on a PUSCH (Physical Uplink Shared Channel), or an aperiodic manner is adopted for time domain CSI reporting.

In an embodiment, setting content for transmitting from the BS (101) includes: frequency domain wideband and sub-band granularity of CQI and precoding Matrix Indicator (PMI), a limitation on channel measurements and a limitation on interference measurements. The information type that the CSI reported by the UE (102) indication includes CQI, PMI, CSI-RS Resource Indicator, Synchronization Signal/Physical Broadcast Channel (SS/PBCH) Block Resource Indicator (SSBRI), SSB Resource Indicator, Lay Indicator (LI), Rank Indicator (RI), Layer 1 Signal Received Power (L1-RSRP), or L1-SINR (Layer 1 Signal Interference plus Noise Ratio), and the like (at step 1006, 1007, 1008).

In general, reporting an actual precoder incurs high overhead. Therefore, the UE (102) selects closest precoder from a preconfigured codebook based on the rank and current channel state. In the existing methods, when the precoder set is large, then the reporting overhead is high and smaller precoder set implies lower accuracy while reporting. In an embodiment, precoder estimation refers to the information that is used to estimate the precoding matrix in a wireless communication system. Precoding is a method used to enhance the performance of the wireless communication systems. The precoding matrix is a key parameter that determines the quality of the transmitted signal. The precoder is selected based on from a codebook based on the CSI available at the BS (101).

Figure 2:
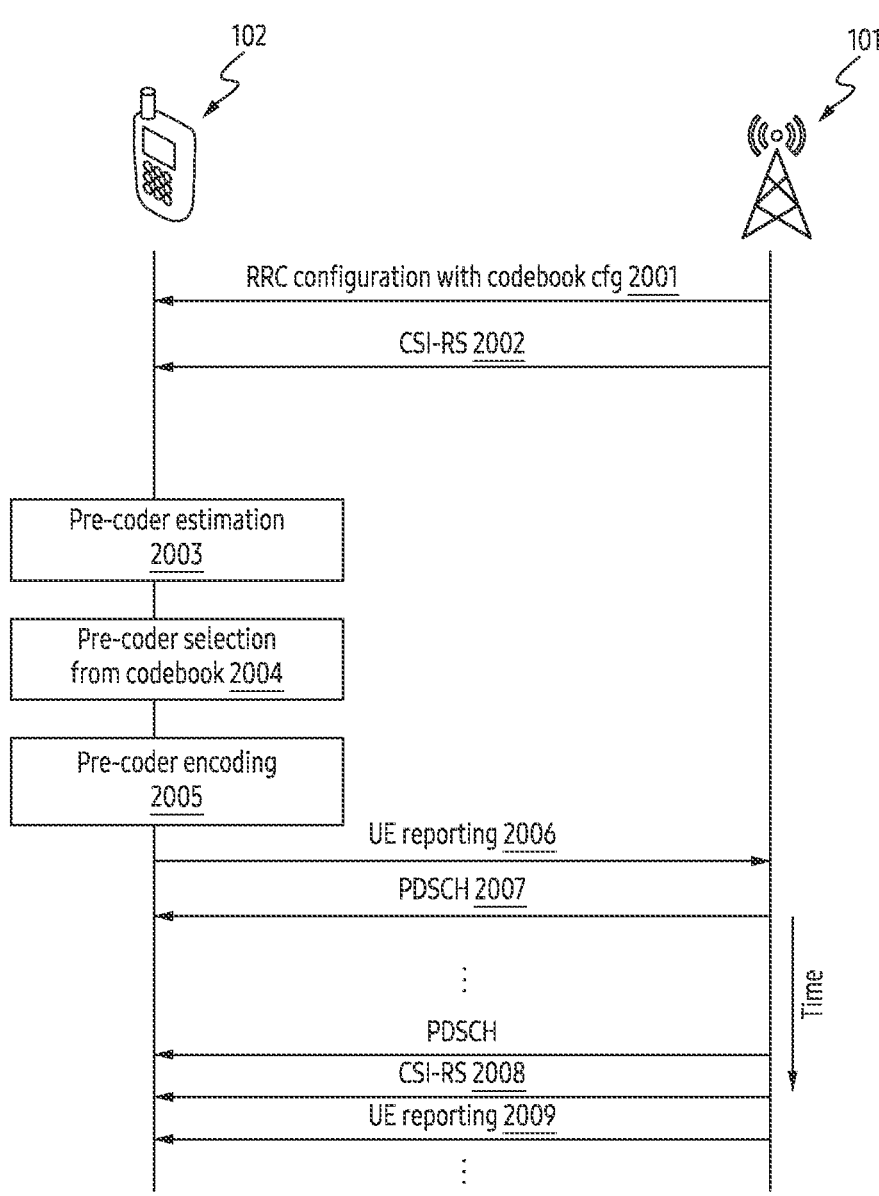
FIG. 2 is a signal flow diagram illustrating the NR CSI feedback procedure including codebook configuration signal transmission, according to the prior art.

FIG. 2 is a signal flow diagram illustrating the NR CSI feedback procedure including codebook configuration signal transmission, according to the prior art. The diagram includes the BS (101) and the UE (102) communicating with each other.

The BS (101) transmits the signalling message to the UE (102) (at step 2001). The signalling message can be RRC configuration message along with the AI configuration and the CSI-RS signal (at step 2002). Once the signalling message is received at the UE (102), the precoder estimation is performed (at step 2003). A Physical Downlink Control Channel PDCCH is a physical channel that carries Downlink Control Information (DCI) is transmitted to the UE (102) based on the precoder estimation information.

In an embodiment, precoder estimation refers to the information that is used to estimate the precoding matrix in a wireless communication system. Precoding is a method used to enhance the performance of the wireless communication systems. The precoding matrix is a key parameter that determines the quality of the transmitted signal. The precoder is selected based on from a codebook based on the CSI available at the BS (101).

The NR includes three types of precoding. The BS (101) specifies the codebook to be used by the UE (102) (at step 2004) using RRC signalling referring to FIG. 1 and FIG. 2. A first type of CSI codebook possess low overhead and intended for single-user MIMO (SU-MIMO). A second type of CSI codebook possess high performance and overhead. The second type is intended for Multi-User MIMO (MU-MIMO). A third type of CSI codebook includes eType-2 codebook. An eType-2 codebook is optimized since the UE (102) sends feedback only for scheduled carriers. However, in poor channel conditions, the UE (102) can wrongly infer the number of carriers that were scheduled. In all the three types of precoding, the UE (102) selects the closest precoder from the codebook set and report the precoder to the BS (101) using the UE (102) reporting signal. The precoder is encoded by the UE (102) (at step 2005). The UE (102) transmits the UE reporting signal (at step 2006). The BS (101) transmits PDSCH (at step 2007) and the CSI-RS (at step 2008). Further the steps are repeated to report the UE (at step 2009).

Figure 3:
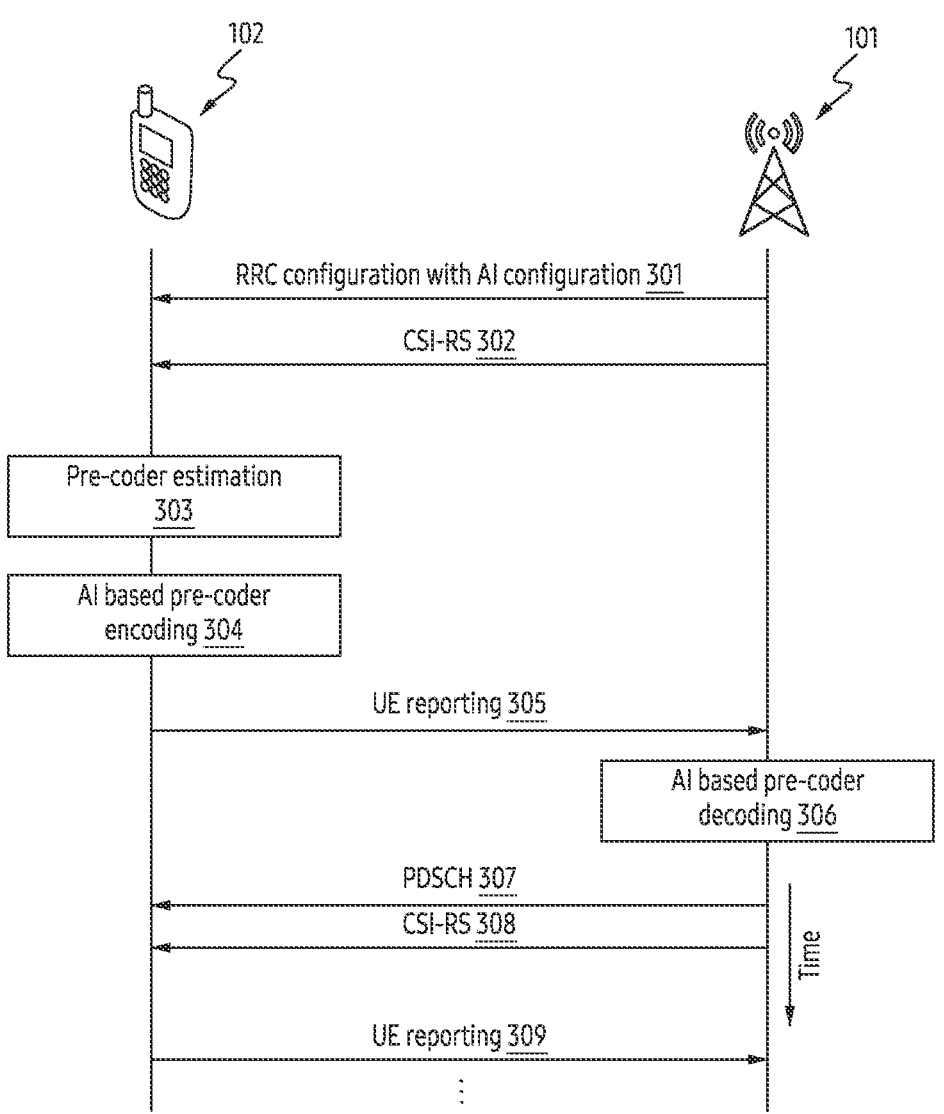
FIG. 3 is a signal flow diagram illustrating the NR CSI feedback procedure including AI based coding signal transmission for AI based CSI coding, according to various embodiments.

FIG. 3 is the signal flow diagram illustrating the NR CSI feedback procedure including AI based coding signal transmission, according to various embodiments.

Referring to FIG. 3 at step (301), the BS (101) transmits the configuration details including AI based coding to be performed at the UE (102) using an AI based CSI encoding controller (105). The configuration details can be RRC configuration. Also, the CSI-RS signal is transmitted to the UE (102) along with the RRC configuration signal. At the UE (102) precoder estimation is performed using precoder estimator (106).

The CSI feedback procedure in the NR involves the transmission of channel quality information from the UE (102) to the BS (101) to facilitate adaptive modulation and coding (AMC) and beamforming.

At step (302), the CSI-RS signal is transmitted from the BS (101) to the UE (102). The CSI-RS is a type of reference signal in 5G NR that is used for channel measurement and CSI feedback. The CSI-RS is transmitted periodically by the BS (101) on a set of predefined antenna ports, and is used by the UE (102) to estimate the channel quality and provide feedback to the BS (101).

At step (303) the precoder estimation is performed. The AI-based CSI feedback network is to deploy a joint AI model on the terminal side and the base station side, generally, a certain neural network is used as the CSI Information coding and compressing module, so as to perform compression coding on all channel characteristics or part of channel characteristics measured and channel estimated by the UE (102) on the CSI-RS transmitted by the BS (101), so as to form a precoder, report the precoder to the BS (101) through an Uplink Channel such as PUCCH (Physical Uplink Control Channel) or PUSCH (Physical Uplink Shared Channel), the base station side uses an Artificial Intelligence decoding network matched with the encoder and recover all channel characteristics or part of channel characteristics from the received precoder through a priori knowledge stored in the decoding network.

Examples of the UE (102) s include, but are not limited to, a smartphone, a mobile phone, a laptop, an Internet of Thing (IoT) device, etc.

At step (304), the UE (102) determines the precoder. An AI based coding is performed using the AI based CSI encoding controller (105) based on the RRC configuration received from the BS (101). The encoded CSI including the precoder is transmitted to the BS (101). The BS (101) decodes the precoder using the AI based method using a decoding model (206). The decoded precoder information is used for data scheduling using the AI based CSI decoding controller (205).

At step (304), the AI based CSI reporting of the precoders is performed by the AI based CSI decoding controller (205) using time measurement values of the CS and using the frequency sub-band measurements. The CSI reporting using the time measurements, a current precoder report is used along with the past reports or recently generated reports from the UE. The wireless channel is correlated in time. Using the current report along with past reports from the UE (102) during CSI decoding improves the decoding performance.

At step (305), the AI based CSI decoding is performed by the AI based CSI decoding controller (205) using frequency sub-band measurements or using time measurements or both frequency sub-band measurement and time measurement. The wireless channel is correlated in frequency. Hence, performance enhancement during decoding or achieving the decoding performance using lower number of bits is feasible while transmitting the CSI metrics for multiple sub-bands in a single CSI report.

At step (307 and 308), once the AI based CSI controller (205) decodes the CSI at step 306, the PDSCH signal along with the CSI-RS is sent to the UE (102) from the BS (101) for the data transmission. The PDSCH is a shared channel, and can be used to transmit the data to multiple UEs (102) at the same time using different resource allocations. The PDSCH can also be used with multiple-input multiple-output (MIMO) techniques. A multiple antenna ports are used at the BS (101) to transmit the data to the UE (102).

The RRC signaling is an essential part of wireless communication systems. The RRC signaling is responsible for controlling establishment, maintenance, and release of radio bearers between the UE (102) and the network. The RRC signaling includes messages exchanged between the UE (102) and the BS (101), and the RRC signal is used to establish a connection, transfer data, and release the connection when no longer needed. The RRC signaling is also used to manage power consumption and handover of the UE (102) between different cells or base stations. The RRC signaling messages can be but not limited to a RRC Connection Request, a RRC Connection Setup, a RRC Connection Release, a Radio Bearer Setup, a Radio Bearer Release, a Handover Preparation, and a Handover Decision.

The DCI signaling used in wireless communication systems. The DCI signaling can be used in but not limited to LTE (Long-Term Evolution) and 5G NR (New Radio) networks. The DCI signaling is transmitted from the BS (101) to the UE (102) (User Equipment) on the downlink channel. The downlink channel includes control information for downlink data transmission.

The AI model includes two parts such as model structure and weights. The model structure includes parameters such as number of layers, type of layers, number of neurons, activation type in each layer and the like. The weights can define values for combining inputs to a layer output.

The model selection implies selecting a pair of models. The pair of models can be the encoding model, the decoding model (206) based on requirements. The encoder equation is $C = f_e(X, \theta_e)$ and the decoder equation is $Y = f_d(C, \theta_d)$. The weights $\theta_d$ and $\theta_e$ are chosen based on back-propagation based training methods such as SGD (Stochastic Gradient Descent) to minimize and/or reduce the error function $f_{er}$ (Y-X). The encoding model is used by the UE (102) to encode the CSI information into a bit sequence of the precoder data. The encoded data segments of the precoder data are sent to the BS (101) for decoding in the BS (101). The encoded bit segments are decoded based on the AI model. Once the connection is established PDSCH signals are sent to the UE (102) and the communication is established.

At step (309), the UE reporting refers to the procedure where the UE (102) provides feedback to the BS (101) regarding the channel quality, system performance, and other related parameters. The UE (102) reporting is an essential mechanism for the BS (101) to optimize the transmission parameters and improve the overall system performance.

Figure 4:
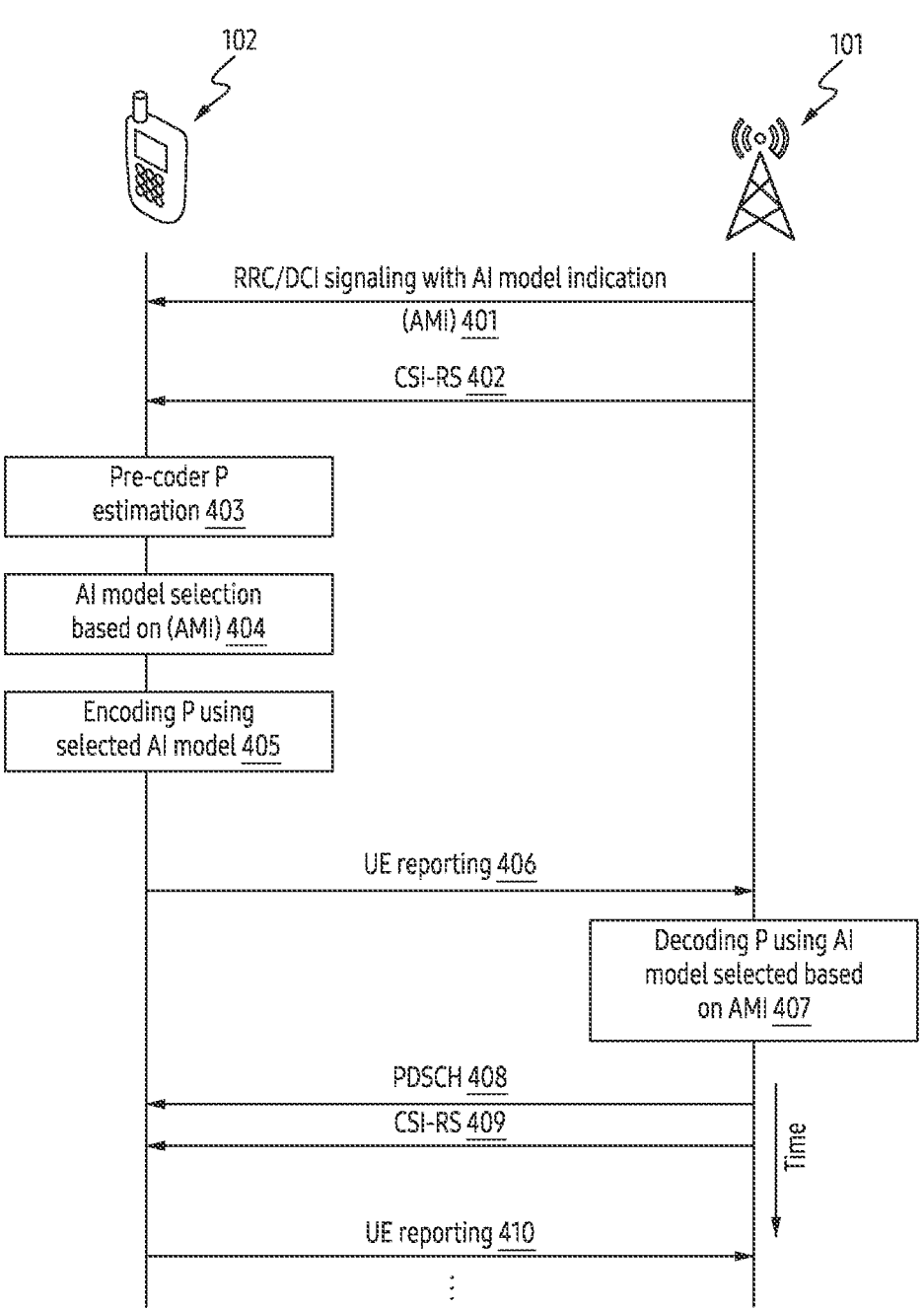
FIG. 4 is a signal flow diagram illustrating transmission of a signaling message with a pre-stored AI model information for AI based CSI coding, according to various embodiments.

FIG. 4 is a signal flow diagram illustrating transmission of the signaling message with the pre-stored AI model information for AI based CSI coding, according to various embodiments.

FIG. 4 illustrates a network and signal flow diagram illustrating transmission of signaling message with a pre-stored AI model indicator, according to various embodiments. Referring to FIG. 4, the BS (101) transmits a signaling message along with the encoder parameters to the UE (102). The signaling message can be Radio Resource Control (RRC) or DCI signals, AI model Indicator (AMI). The pre-stored models are when the model weights are stored on either UE or BS.

Referring to FIG. 4 at step 401, the RRC/DCI signaling with the AMI is transmitted to the UE (102) from the BS (101). The AMI indicates the model to be used for encoding the precoder at the UE (102). The AMI is transmitted to the UE (102) along with RRC/DCI signals. Further, the CSI-RS is transmitted to the UE (102) from the BS (101) at step (402).

At step 403, the precoder is estimated based on the AMI received from the BS (101). The AI model is selected at the UE (102). The precoder is encoded at the UE (102) using the selected AI model based on the received AMI at step 404 and step 405.

In an embodiment, using pre-stored weights in the UE (102) and the BS (101) is used for AI based coding. The weights and structures are stored at the UE (102) and the BS (101) a-priori. The BS (101) indicates to the UE (102) to select the model (or can be referred as encoding model) for encoding the CSI using the AMI via RRC or DCI.

At step 406, the UE (102) reporting is performed. The UE transmits the encoded precoder to the BS (101) for decoding the precoder.

At step 407, the BS (101) selects the decoding model for decoding the encoded CSI based on the AMI for decoding readiness. Both the UE (102) and the BS (101) then use respective models for encoding and decoding of the CSI. The UE (102) and the BS (101) can include the partial details of the models specific only to the encoding and decoding respectively. The UE (102) estimates the precoder. The precoder is segmented into the plurality of data segments. The encoded precoder is sent to the BS (101) for decoding the data segments (At step 403-405).

At step 408, 409, 410, once the BS (101) decodes the precoder at the BS (101) based on the AMI. The PDSCH and CSI-RS is transmitted to the UE (102) for the data transmission and the steps are repeated.

Figure 5:
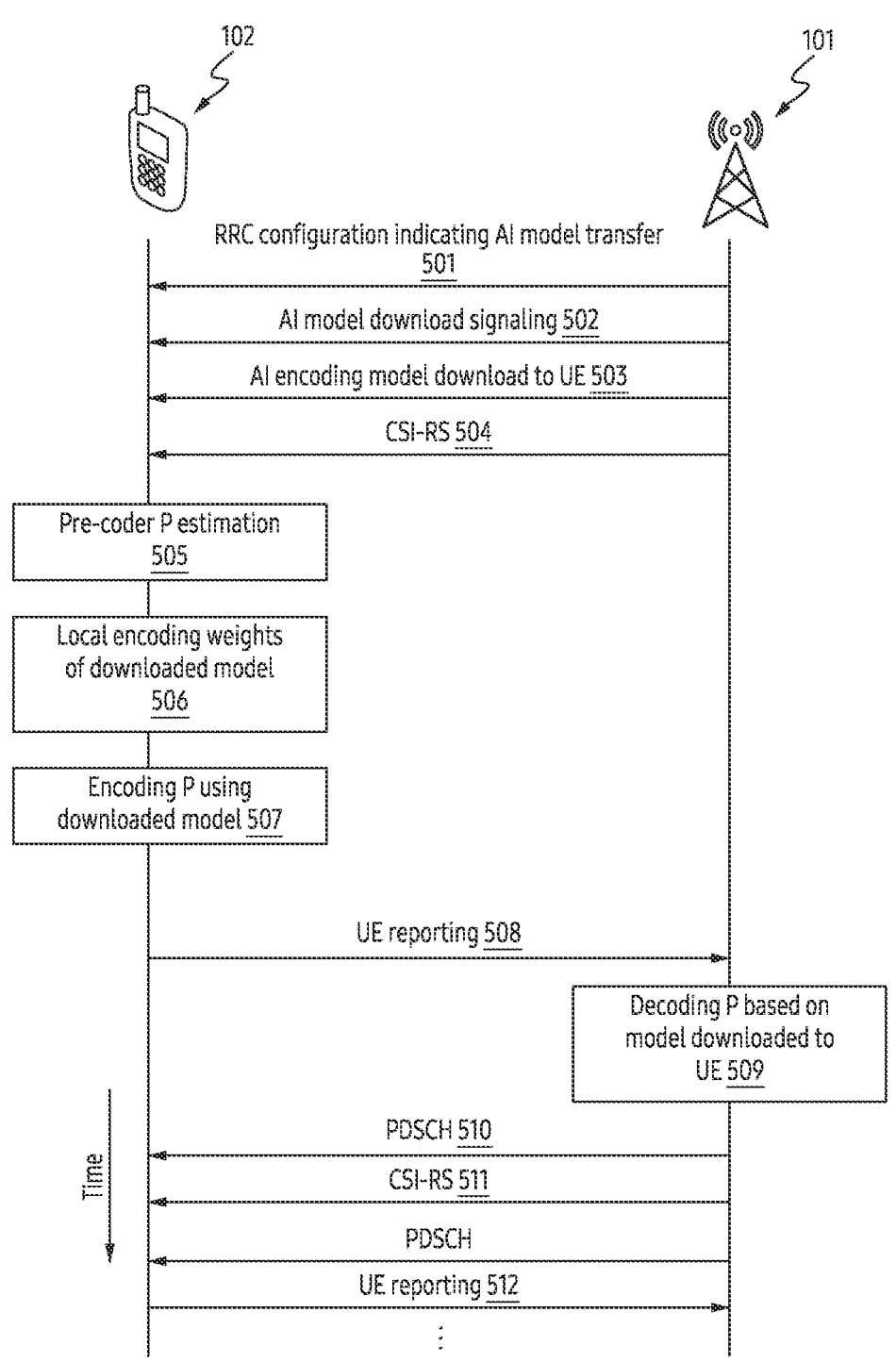
FIG. 5 is a signal flow diagram illustrating transmission of the signaling message with a downloaded model information for AI based CSI coding, according to various embodiments.

FIG. 5 is a signal flow diagram illustrating transmission of signaling message with downloaded model information for AI based CSI coding, according to various embodiments. In the downloaded model, the weights or entire model is transferred from an external source. The external device can be the BS.

Referring to FIG. 5, a mode of operation for AI based precoding is described.

At step 501, a signaling message is transmitted to the UE (102). The signaling message can be RRC configuration indicating the AI model transfer.

At step 502, the BS (101) also transmits AI download signaling (step 502), AI encoding model download (503) and CSI-RS (504). The AI download signaling indicates the encoding model to be downloaded The model transfer procedure support is indicated to the UE (102) by the BS (101) in RRC or can indicate the support using control signal such as DCI, the encoding model information ($E_{AI}$) (step 502). The information is transmitted to the UE (102) (step 503).

At step 504, the UE (102) configures the received encoding model ($E_{AI}$) for CSI encoding readiness. The UE (102) estimates or determines the precoder and uses the encoding model ($E_{AI}$) for encoding the precoder data (at step 505) and reports the CSI back to the BS (101). The encoding readiness refers to configuring the received model, that is to map the model weights to the corresponding model layers for encoding (at step 506).

At step 507, the precoding is a technique used in wireless communication systems to improve the quality of the transmitted signal. In CSI encoding, precoding refers to the manipulation of the transmitted signal by the transmitter based on the CSI feedback received from the receiver. The precoder modifies the transmitted signal to adapt to the current channel conditions, thereby improving the reliability and efficiency of the communication channel. The CSI feedback can be obtained through various methods, such as explicit feedback from the UE (102), implicit feedback from the wireless communication channel, or periodic feedback. The encoding model encodes the received CSI signal and transmit to the BS (101).

The encoding model segments the precoder data into the bit segments and the bit segments are encoded using the AI model based on the encoding parameters received from the BS (101). The encoding parameters can be the download information. The BS (101) receives the encoded bit stream from the UE (102). The encoding model selects the Decoding model ($D_{AI}$) (206) based on the received encoded model and repots the CSI. The AI model download information can be a model transfer procedure support or the encoding model to be downloaded for performing the CSI encoding at the UE (102).

At step 508, the UE (102) reports the encoded precoder to the BS.

At step 509, the BS (101) receives the encoded bit stream and based on the encoded AI ($E_{AI}$). The BS (101) selects the decoding model ($D_{AI}$) (206). The precoder information is decoded based on model downloaded to the UE (102) at the BS (101). In an embodiment, the BS (101) can include both the encoding and the decoding model (206) and the UE (102) can include the encoding model.

At step 510, 511 and 512, once the BS (101) decodes the precoder at the BS (101) based on the decoding model, the PDSCH and CSI-RS is transmitted to the UE (102) for the data transmission and the steps are repeated.

Figure 6:
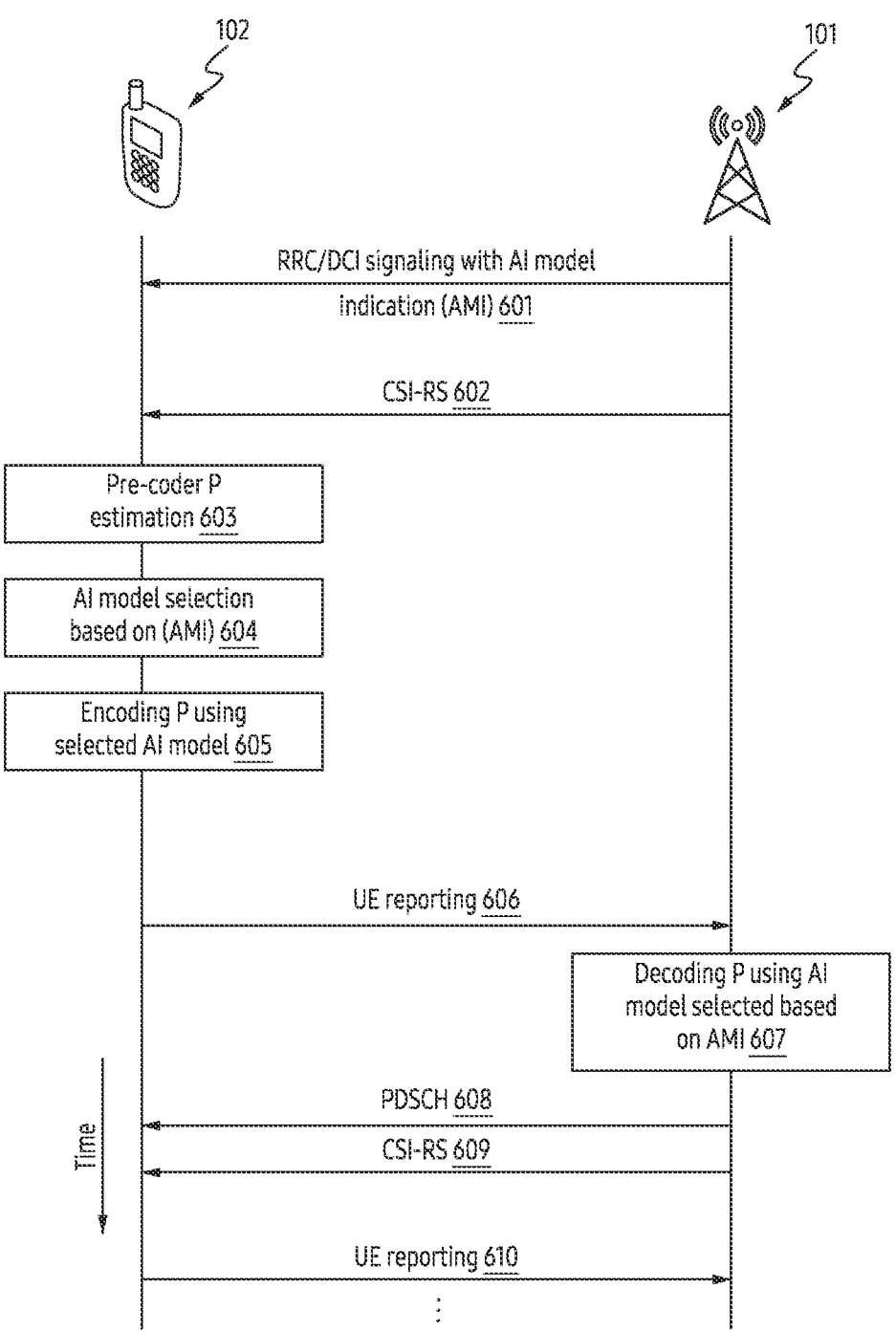
FIG. 6 is a signal flow diagram illustrating AI based CSI coding based on frequency sub-bands, according to various embodiments.

FIG. 6 is a signal flow diagram illustrating the AI based CSI coding using frequency sub-bands in a pre-stored model, according to various embodiments. Referring to FIG. 6, the BS (101) or both the UE (102) and the BS (101) can use more than one time measurements or frequency sub-bands measurements to achieve better decoding performance and higher accuracy. Also, higher compression ratio and reduced CSI reporting overhead.

Referring to FIG. 6, the method for channel correlation using multiple recent time measurements are disclosed.

At step 601, the RRC/DCI signaling with AI model indication (AMI) is transmitted to the UE (102) from the BS (101). The BS (101) also transmits the CSI-RS to the UE (102) at 602.

At step 603 to 607, the UE (102) or the BS (101) or both use most estimates from most recent $M_t$ time occasions to CSI reporting performance. The method for channel correlation using multiple sub-bands are disclosed. The UE (102) or the BS (101) or both use joint processing to together encode the precoders of $M_b$ frequency sub-bands to improve CSI performance. The joint processing is the UE (102) and the BS (101) performing the encoding and the decoding simultaneously once encoded data segments received at the BS (101) (step 607).

In an embodiment, the method for channel correlation using multiple recent time measurements and sub-bands are disclosed. The UE (102) or the BS (101) or both use estimates based on most recent $M_t$ time occasions where each occasion includes CSI for $M_b$ frequency sub-bands.

In an embodiment, either the BS (101) or both UE (102) and the BS (101) can use more than one recent measurements or sub-bands. Using the channel correlation provides better decoding performance and high accuracy. Also, the compression ratio is high and reduced CSI reporting overhead. The embodiments support operation in both pre-stored weights mode and downloaded model mode. In case of utilizing channel correlation in time, knowledge of the number of time correlation measurements to be used $M_t$, is optional for the UE (102) and mandatory for the BS (101). In case of utilizing channel correlation in frequency, knowledge of the number of sub-band information $M_b$, conveyed as part of the report is mandatory to both the UE (102) and the BS (101). In each case, different or same AI model information is used at both the BS (101) and the UE (102) sides that is coordinated by signaling.

At step 608-610, once the BS (101) decodes the precoder at the BS (101) based on the decoding model, the PDSCH and CSI-RS is transmitted to the UE (102) for the data transmission and the steps are repeated.

Figure 7:
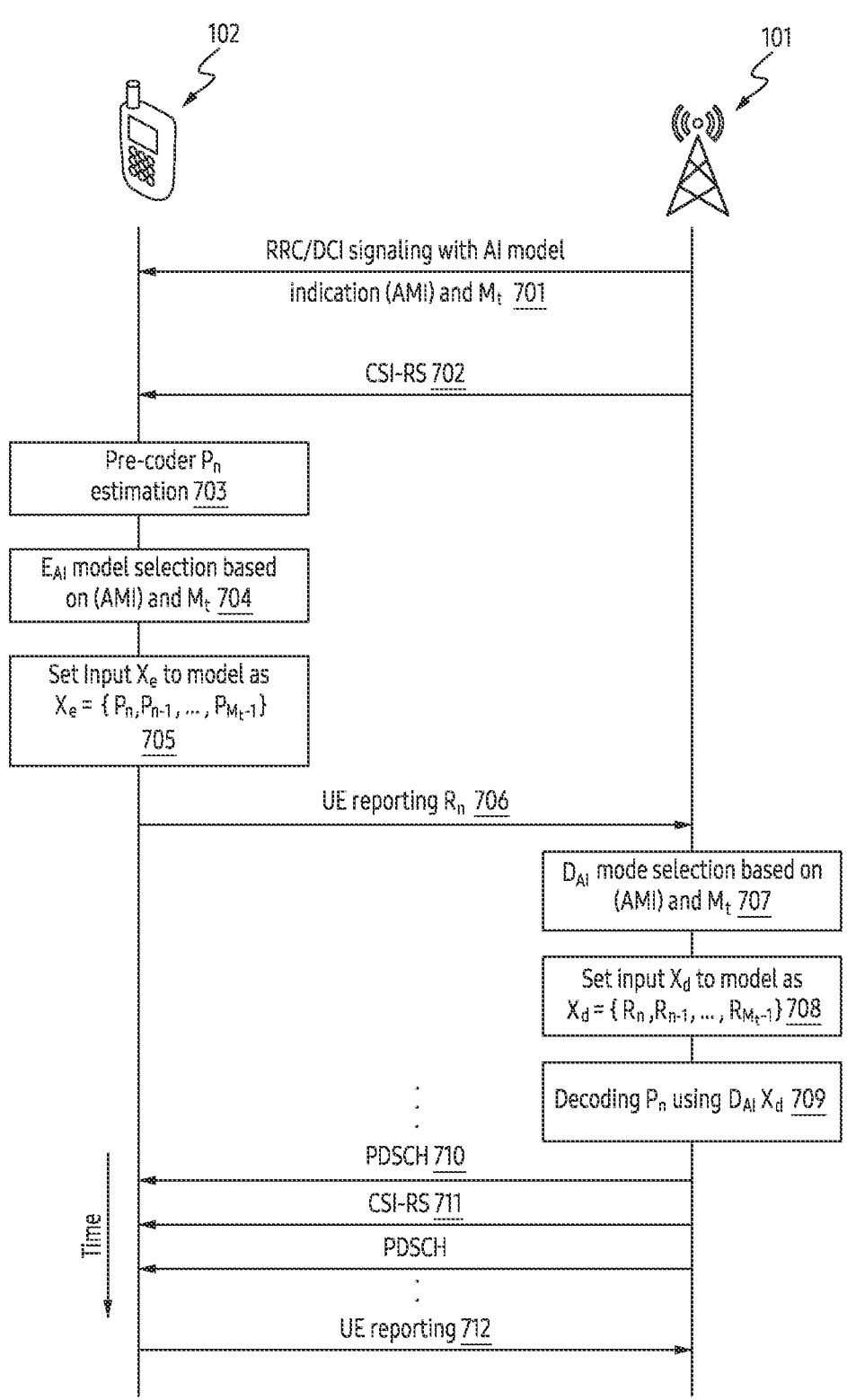
FIG. 7 is a signal flow diagram illustrating the AI based CSI coding based on time measurements using a pre-stored model, according to various embodiments.

FIG. 7 is a signal flow diagram illustrating the AI based CSI coding using on time measurements using pre-stored model, according to various embodiments.

Referring to FIG. 7, the precoder for achieving AI based CSI coding using historical time measurements using pre-stored models as a step-by-step procedure is disclosed.

At step 701 and 702, the BS (101) indicates to the UE (102) via RRC or DCI signaling using the AMI and the number of recent time measurements to be considered $M_t$, for encoding. The time measurements are referred as historical time measurements interchangeably.

At step 703, The UE (102) estimates the precoder using conventional methods. For example, the UE (102) perform an estimation the precoder based on the received CSI-RS. The UE (102) selects the AI model $E_{AI}$ from the memory (103) based on AMI and $M_t$ (704).

At step 705, the UE (102) prepares the input to $E_{AI}$ as $X_e = \{P_n, P_{n-1}, \ldots, P_{M_t-1}\}$ and generates $R_n$ to be shared with BS (101), n being the current time instance. Where the $E_{AI}$ represents the AI based encoding, $M_t$ represents the time measurements, $X_e$ represents the list of arrays including the precoders with the time measurements. The time measurements can be historical time measurements and can be multiple based on the requirements for determining the encoding or decoding model.

At step 706, the UE reports the BS about encoded precoder data Rn.

At step 707, the BS (101) performs the AI model selection $D_{AI}$ from the memory (103) based on AMI and $M_t$. At step 708, the BS (101) prepares the input to $D_{AI}$ as $X_d = \{R_n, R_{n-1}, \ldots, R_{M_t-1}\}$ (step 708). At step 709, using $D_{AI}$ and $X_d$ BS (101) reconstructs the $P_n$ information. Where $X_d$ is the decoding parameter with multiple time instances at the BS (101).

At step 710-712, once the BS (101) decodes the precoder at the BS (101) based on the decoding model, the PDSCH and CSI-RS is transmitted to the UE (102) for the data transmission and the steps are repeated.

Figure 8:
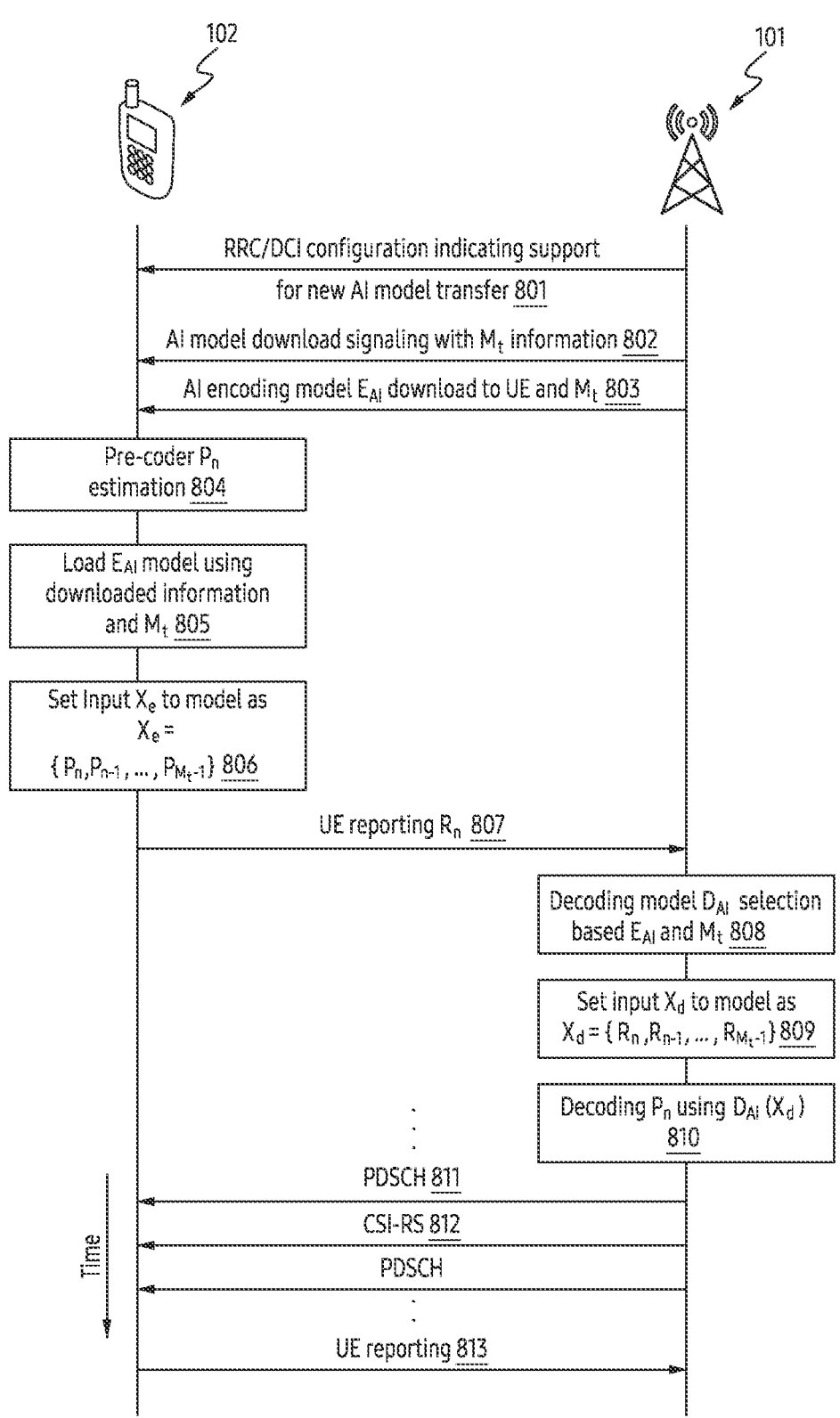
FIG. 8 is a signal flow diagram for AI based CSI coding using time measurements with the downloaded model information, according to various embodiments.

FIG. 8 is a signal flow diagram for AI based CSI coding using time measurements using downloaded model, according to various embodiments.

Referring to FIG. 8, the procedure for achieving AI based coding using historical time measurements using downloaded model as a step-by-step procedure is disclosed.

At step 801, the BS (101) indicates to the UE (102) via RRC or DCI signalling support for the AI model download information for the CSI coding (step 802 and 803). For example, at step 802, the BS (101) transmits AI download signaling with $M_t$ information.

At step 803, using RRC or DCI signaling, the BS (101) indicates to the UE model info of $E_{AI}$ to be downloaded and configuration parameter $M_t$. At step 804, the UE (102) estimates the precoder using conventional methods. For example, the UE (102) perform an estimation the precoder based on the received CSI-RS. At step 805, the UE (102) downloads the encoding model $E_{AI}$ and loads the encoding model to be used. At step 806, the UE (102) prepares the input to $E_{AI}$ as $X_e = \{P_n, P_{n-1}, \ldots, P_{M_t-1}\}$ and generates $R_n$ to be shared with the BS (101), n being the current time instance.

At step 807, the UE (102) transmits the reporting signal along with Rn. At step 808, the BS (101) performs the AI model selection $D_{AI}$ from memory (103) based on $E_{AI}$ downloaded to the UE (102) and $M_t$. The BS (101) prepares the input to the decoded model at 809 to $D_{AI}$ as $X_d = \{R_n, R_{n-1}, \ldots, R_{M_t-1}\}$. Using $D_{AI}$ and $X_d$ the BS (101) reconstructs the $P_n$ information at 810.

At step 811-813, once the BS (101) decodes the precoder at the BS (101) based on the decoding model, the PDSCH and CSI-RS is transmitted to the UE (102) for the data transmission and the steps are repeated.

Figure 9:
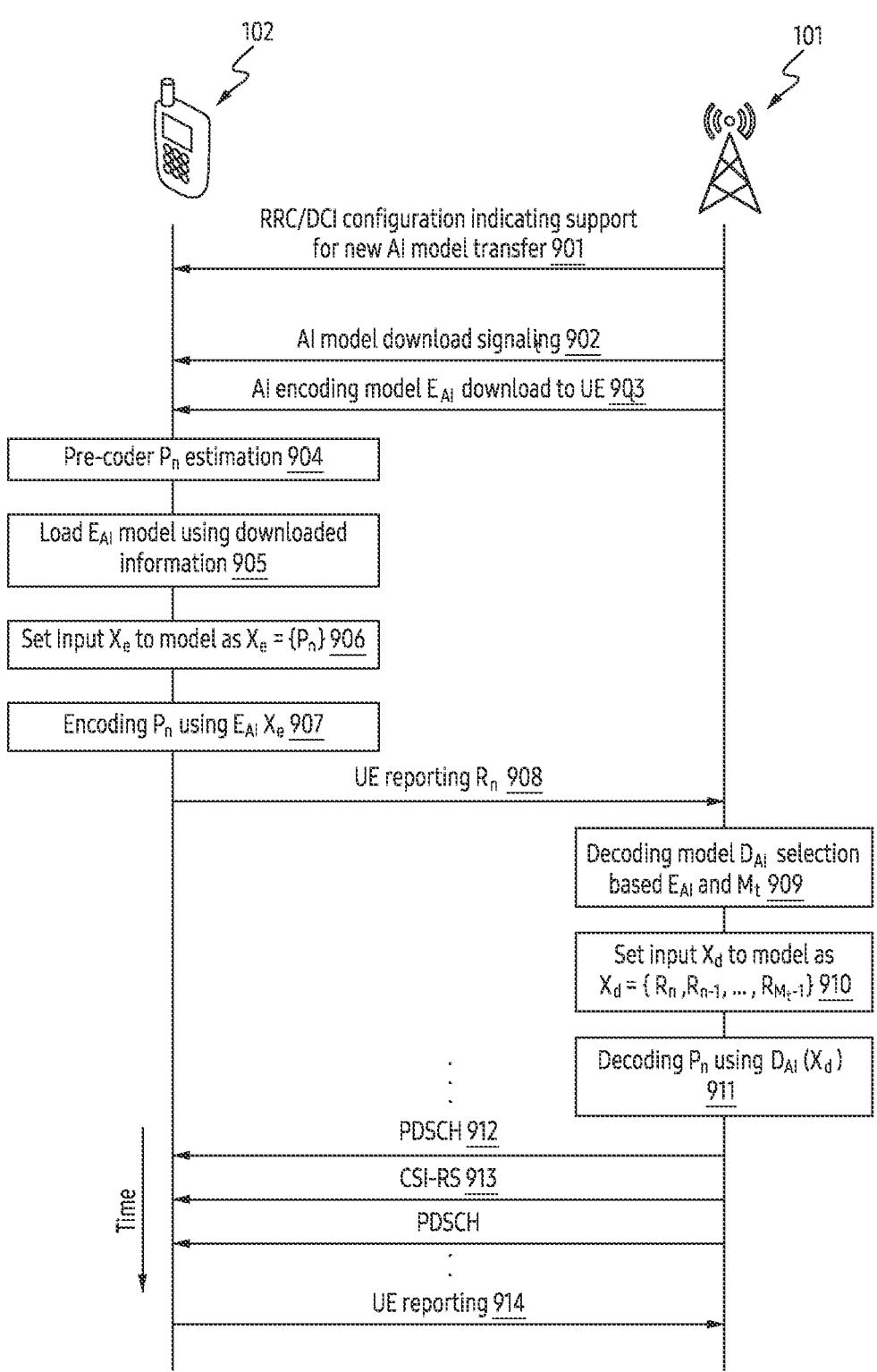
FIG. 9 is a signal flow diagram illustrating CSI reporting based on time measurements using pre-stored model considered at BS using the downloaded model, according to various embodiments.

FIG. 9 is a signal flow diagram illustrating CSI reporting based on time measurements using pre-stored model considered at the BS (101) using downloaded model at the UE (102), according to various embodiments.

Referring to FIG. 9, the procedure for achieving the AI based CSI coding using historical time measurements is described, but considered only on the BS (101) using downloaded model. FIG. 9 shows the procedure for downloaded AI model mode. The AI model is applicable in case of pre-stored model as well. At step 901-903, the BS (101) indicates to the UE (102) via RRC or DCI signalling support for AI model download for CSI encoding.

At step 903, using RRC or DCI signalling, the BS (101) indicates to the UE (102) model info of $E_{AI}$ to be downloaded. The configuration parameter $M_t$ indication is optional. At step 904, the UE (102) estimates the precoder using conventional methods. For example, the UE (102) perform an estimation the precoder based on the received CSI-RS.

At step 905, the UE (102) downloads the model $E_{AI}$ and loads the encoded model to be used. At step 906, the UE (102) prepares the input to $E_{AI}$ as $X_e = \{P_n\}$, hence solely based on current measurement. The UE (102) generates the encoded precoder Rn at step 907 to be shared with the BS (101).

At step 908, the UE (102) report back the encoded precoder Rn to the BS (101).

At step 909, the BS (101) performs AI model selection $D_{AI}$ from memory (103) based on $E_{AI}$ downloaded to UE (102) and the number of previous time measurement reports it needs to consider $M_t$. At step 910, the BS (101) prepares the input to $D_{AI}$ as $X_d = \{R_n, R_{n-1}, \ldots, R_{M_t-1}\}$. At step 911, using $D_{AI}$ and $X_d$ BS reconstructs the $P_n$ information.

At step 912-914, once the BS (101) decodes the precoder at the BS (101) based on the decoding model, the PDSCH and CSI-RS is transmitted to the UE (102) for the data transmission and the steps are repeated.

FIG. 10 is a signal flow diagram illustrating CSI reporting based on frequency sub-bands using pre-stored model, according to various embodiments.

Referring to FIG. 10 shows the procedure for achieving AI based CSI coding multiple frequency sub-band measurements. At step 1010, the BS (101) indicates to the UE (102) via RRC or DCI signaling to select the AI model based on the AMI and communicates the number of frequency sub-band indication $M_B$ (At step 1011).

At step 1012, the UE (102) selects the model $E_{AI}$ based on AMI and $M_B$, and estimates the CSI for $M_B$ bands (step 1013). At step 1014, the UE (102) prepares the input to $E_{AI}$ as $$X_e = \left\{ P_n^b, P_n^{b-1}, \ldots, P_n^{b-(M_B-1)} \right\}$$

hence based on the current measurements, and generates the $R_n$ to be shared with the BS (101). At step 1015, the UE (102) encodes the precoder $R_n$ to be shared to the BS (101).

At step 1016, the UE (102) reports the encoded precoder to the BS (101).

At step 1017, the BS (101) performs the AI model selection $D_{AI}$ from the memory (203) based on $E_{AI}$ and the number of sub-bands $M_B$ considered for encoding. At step

1018, the BS (101) prepares the input to $D_{AI}$ as $X_d=\{R_n\}$. At step 1019, using $D_{AI}$ and $X_d$ the BS (101) reconstructs the $\{P_n^b, P_n^{b-1} \ldots, P_n^{b-(MB-1)}\}$ information.

At step 1020-2022, once the BS (101) decodes the precoder at the BS (101) based on the decoding model, the PDSCH and CSI-RS is transmitted to the UE (102) for the data transmission and the steps are repeated.

FIG. 11 is a signal flow diagram illustrating CSI reporting based on frequency sub-bands using downloaded model, according to various embodiments.

FIG. 11 shows the procedure based on the BS (101) to the UE (102) model transfer for achieving the AI based CSI coding with frequency sub-band measurements.

At step 1101-1103, the BS (101) indicates to the UE (102) via RRC or DCI (Downlink controlling information) signaling support for model information download and information on the number of frequency sub-band indication $M_B$.

At step 1104, upon receiving signaling for model download, the UE (102) downloads the model $E_{AI}$ and configures the $E_{AI}$ based on $M_B$, and performs additional procedures for CSI estimation on the $M_B$ sub-bands (step 1105). At step 1106, the UE (102) prepares the input to $E_{AI}$ as $X_e=\{P_n^b, P_n^{b-1} \ldots, P_n^{b-(MB-1)}\}$, based on the latest measurement, and generates $R_n$ to be shared with the BS (101) using $E_{AI}$ At step 1107.

At step 1108, the UE (102) reports the precoder to the BS (101).

At step 1109, the BS (101) performs the AI model selection $D_{AI}$ based on the $E_{AI}$ downloaded to the UE (102) and the number of sub-bands $M_B$ considered for reporting at step 1010. The BS (101) prepares the input to $D_{AI}$ as $X_d=\{R_n\}$. Using $D_{AI}$ and $X_d$ BS reconstructs the $\{P_n^b, P_n^{b-1}, \ldots, P_n^{b-(MB-1)}\}$ information at step 1011.

At step 1112-1114, once the BS (101) decodes the precoder at the BS (101) based on the decoding model, the PDSCH and CSI-RS is transmitted to the UE (102) for the data transmission and the steps are repeated.

Figure 12:
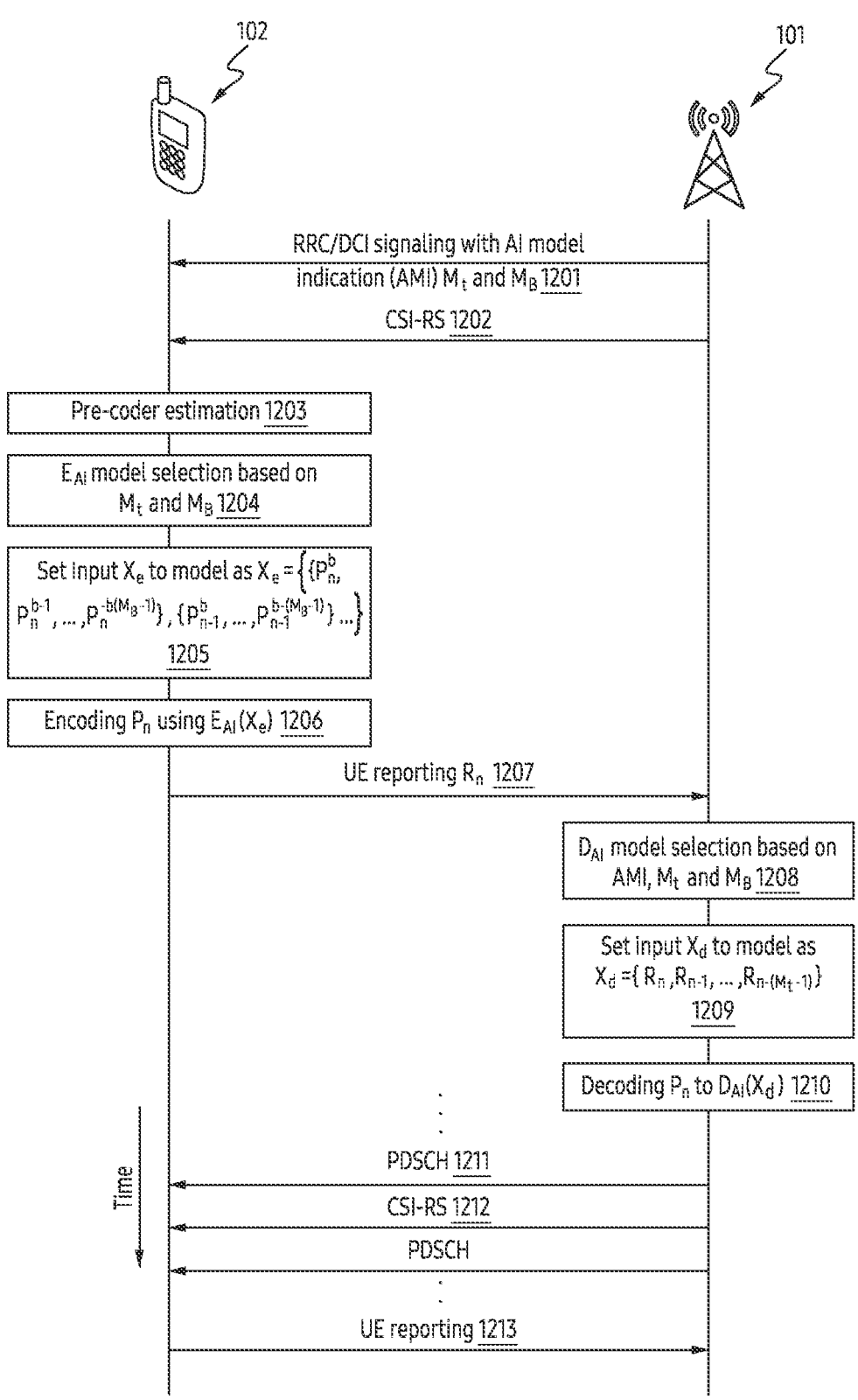
FIG. 12 is a signal flow diagram illustrating CSI reporting based on time measurements and frequency sub-bands measurements using the pre-stored model for AI based CSI coding, according to various embodiments.

FIG. 12 is a signal flow diagram illustrating the CSI reporting based on time measurements and frequency sub-bands measurements using pre-stored model, according to various embodiments.

FIG. 12 shows the procedure based on stored AI model for achieving the AI based CSI coding using multiple historical time measurements with frequency sub-band measurements information.

At step 1201 and 1202, the BS (101) indicates to the UE (102) via RRC or DCI signaling the model information using the AMI along with frequency sub-band and historical time measurements using $M_B$ and $M_t$ parameters.

At step 1203, the UE (102) selects and configures the model $E_{AI}$ based on the AMI, $M_t$ and $M_B$. The UE (102) also, configures additional measurement procedures to support $M_B$ sub-band measurements (at step 1204). At step 1205, on each measurement occasion, UE (102) prepares the measurement vector $$X_e = \left\{ \left\{ P_n^b, P_n^{b-1}, \ldots, P_n^{b-(M_B-1)} \right\}, \left\{ P_{n-1}^b, P_{n-1}^{b-1}, \ldots, P_{n-1}^{b-(M_B-1)} \right\}, \\ \left\{ P_{n-(M_t-1)}^b, P_{n-(M_t-1)}^{b-1}, \ldots, P_{n-(M_t-1)}^{b-(M_B-1)} \right\} \right\}$$

for encoding using the $E_{AE}$ to produce $R_n$. At step 1206 and 1207, the Ry is generated and transferred to the BS (101).

At step 1208-1210, the BS (101) selects the AI model $D_{AE}$ and prepares the input vector $X_d$ based on the latest $M_t$ measurements as $X_d=\{R_n, R_{n-1}, \ldots, R_{n-(M_t-1)}\}$. Using $D_{AI}$ and $X_d$ BS reconstructs the $$\left\{ P_n^b, P_n^{b-1}, \ldots, P_n^{b-(M_B-1)} \right\}$$

information.

At step 1211-1213, once the BS (101) decodes the precoder at the BS (101) based on the decoding model, the PDSCH and CSI-RS is transmitted to the UE (102) for the data transmission and the steps are repeated.

Figure 13:
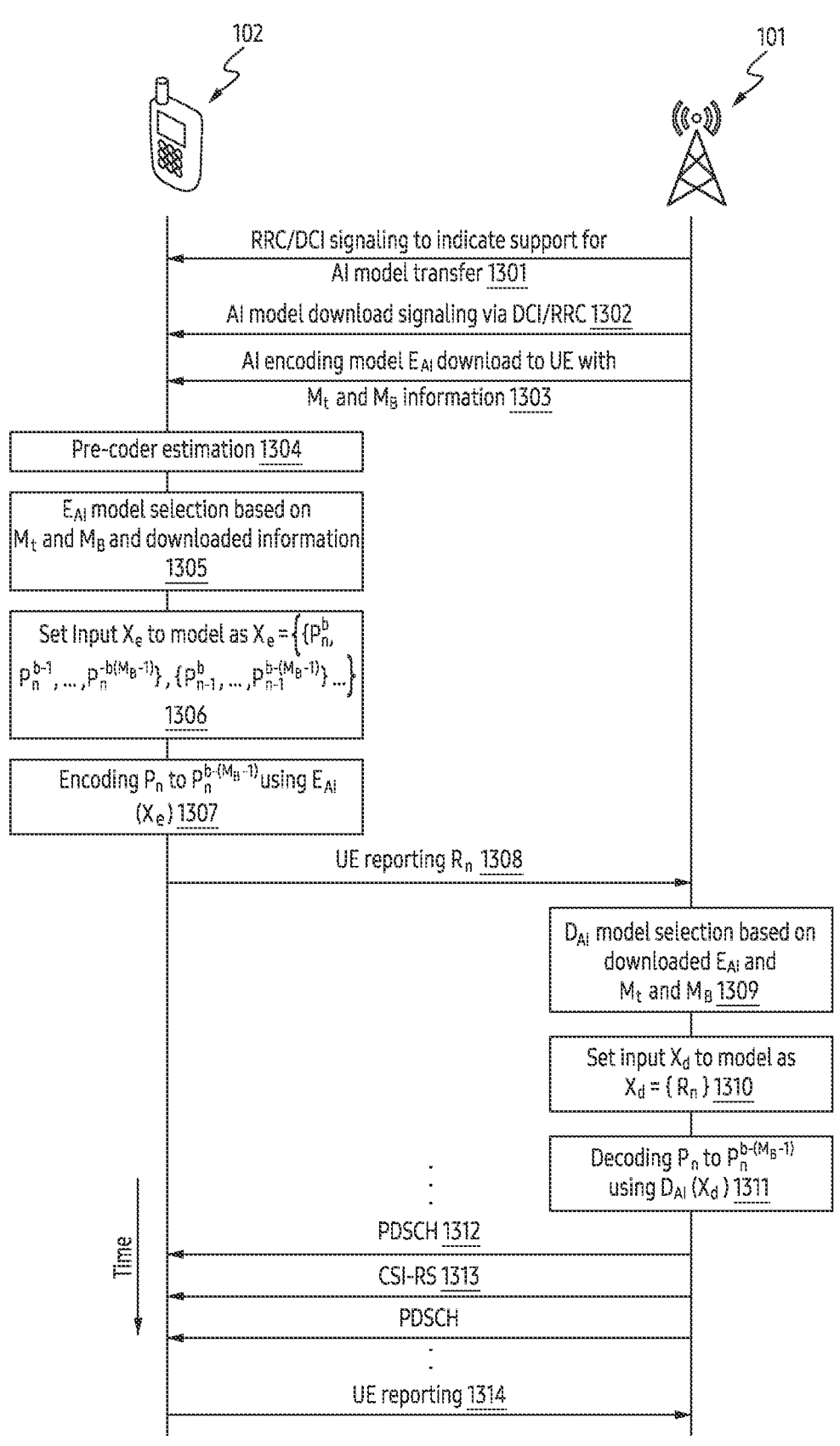
FIG. 13 is a signal flow diagram illustrating CSI reporting based on the time measurements and the frequency sub-bands measurements using the downloaded model for AI based CSI coding, according to various embodiments.

FIG. 13 is a signal flow diagram illustrating CSI reporting based on time measurements and frequency sub-bands measurements using downloaded model, according to various embodiments.

FIG. 13 shows the procedure based on the BS to the UE (102) model transfer for achieving the AI based CSI coding using historical time measurements with frequency sub-band measurements information. At step 1301-1303, the BS (101) indicates to the UE (102) via RRC or DCI signalling the support for model transfer. The BS (101) dynamically or using RRC signals model transfer grants along with $M_t$ and $M_B$ information. At step 1304, the UE (102) downloads and configures the model $E_{AI}$ based on $M_t$ and $M_B$. At step 1305, the UE (102) also, configures additional measurement procedures to support $M_B$ sub-band measurements.

At step 1306, on each measurement, UE (102) prepares the measurement vector $$X_e = \left\{ \left\{ P_n^b, P_n^{b-1}, \ldots, P_n^{b-(M_B-1)} \right\}, \left\{ P_{n-1}^b, P_{n-1}^{b-1}, \ldots, P_{n-1}^{b-(M_B-1)} \right\}, \\ \left\{ P_{n-(M_t-1)}^b, P_{n-(M_t-1)}^{b-1}, \ldots, P_{n-(M_t-1)}^{b-(M_B-1)} \right\} \right\},$$

for encoding using $E_{AE}$ to produce $R_n$.

At 1307-1308, the $R_n$ is transferred to the BS (101).

At 1309-1311, the BS (101) configures the model $D_{AI}$ and prepares the input vector $X_d$ based on the $M_t$ measurements as $$X_d = \left\{ R_n, R_{n-1}, \ldots, R_{n-(M_t-1)} \right\}$$

and considering $M_B$.

Using the $D_{AI}$ and $X_d$ the BS (101) reconstructs the $$\left\{ P_n^b, P_n^{b-1}, \ldots, P_n^{b-(M_B-1)} \right\}$$

information at step 1311.

At step 1312-1314, once the BS (101) decodes the precoder at the BS (101) based on the decoding model, the PDSCH and CSI-RS is transmitted to the UE (102) for the data transmission and the steps are repeated.

Figure 14:
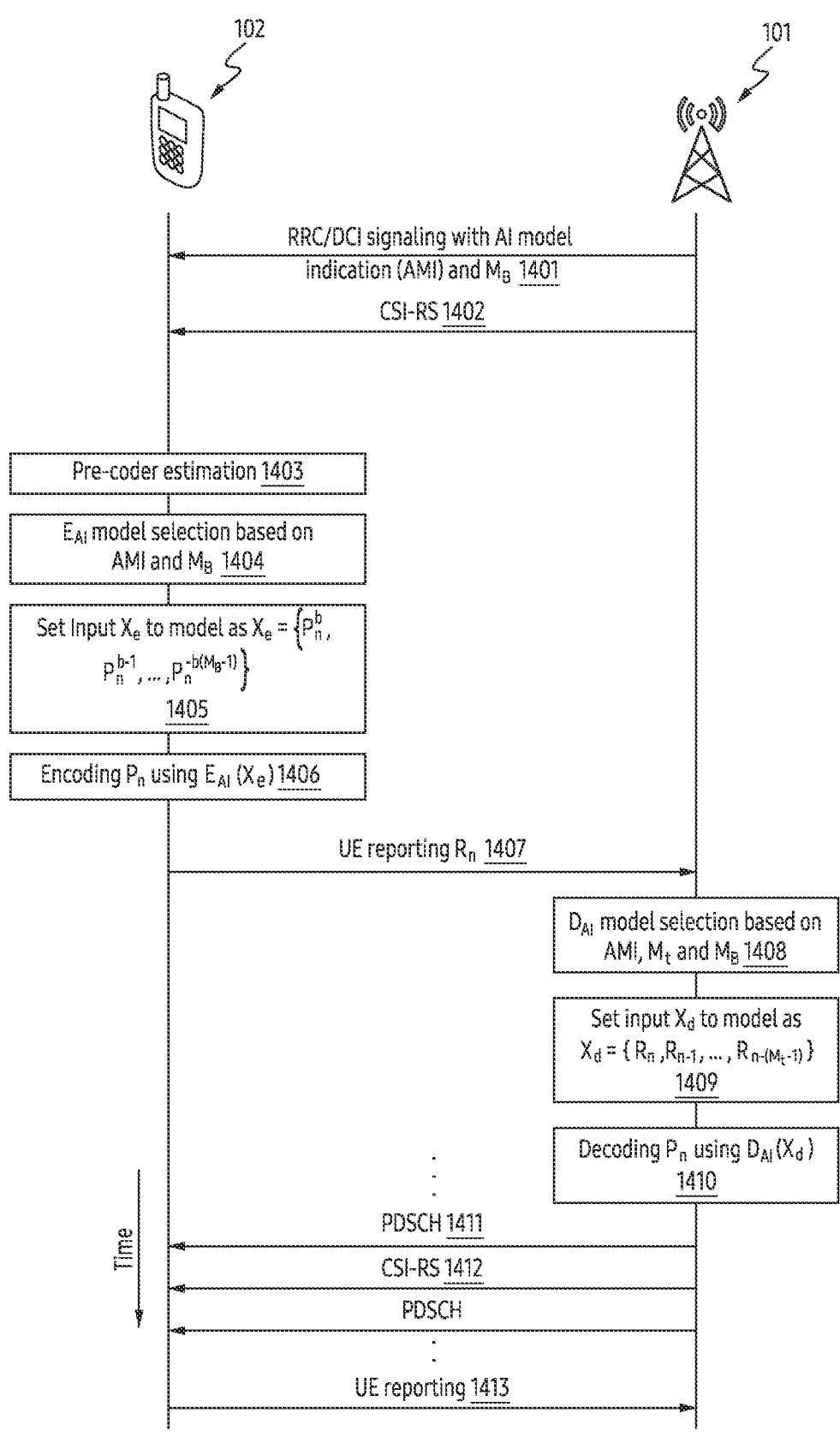
FIG. 14 is a signal flow diagram illustrating CSI reporting based on the time measurements and the frequency sub-bands measurements using one sided operation at BS, according to various embodiments.

FIG. 14 is a signal flow diagram illustrating CSI reporting based on the time measurements and the frequency sub-bands measurements using one sided operation, according to various embodiments.

FIG. 14 shows the procedure based on stored AI model for achieving AI based CSI coding using the historical time measurements with frequency sub-band measurements information.

At step 1401, the BS (101) indicates to the UE (102) via RRC or DCI signaling the model information using the AMI along with the frequency sub-band information $M_B$ (at 1402). At step 1403, the UE (102) selects and configures the encoding model $E_{AI}$ based on the AMI and the $M_B$.

At step 1404, the UE (102) configures additional measurement procedures to support $M_B$ sub-band measurements. At 1405, on each measurement occasion, the UE (102) prepares the measurement vector $$X_e = \left\{ \left\{ P_n^b, P_n^{b-1}, \dots, P_n^{b-(M_B-1)} \right\} \right.$$

for encoding using $E_{AE}$ to produce $R_n$. At step 1406 to 1407, the $R_n$ is generated and transferred to the BS (101).

At step 1408, the BS (101) selects the AI model $D_{AI}$ and prepares the input vector $X_d$ based on the latest $M_r$ measurements as $X_d = \{R_n, R_{n-1}, \dots, R_{n-(M_r-1)}\}$. At step 1409, using the $D_{AI}$ and the $X_d$ BS (101) reconstructs the $$\left\{ P_n^b, P_n^{b-1}, \dots, P_n^{b-(M_B-1)} \right\}$$

information. Note that, the UE (102) is transparent to usage of $M_r$ reports used by the BS (101) while decoding (at step 1410).

At step 1411-1413, once the BS (101) decodes the precoder at the BS (101) based on the decoding model, the PDSCH and CSI-RS is transmitted to the UE (102) for the data transmission and the steps are repeated.

Figure 15:
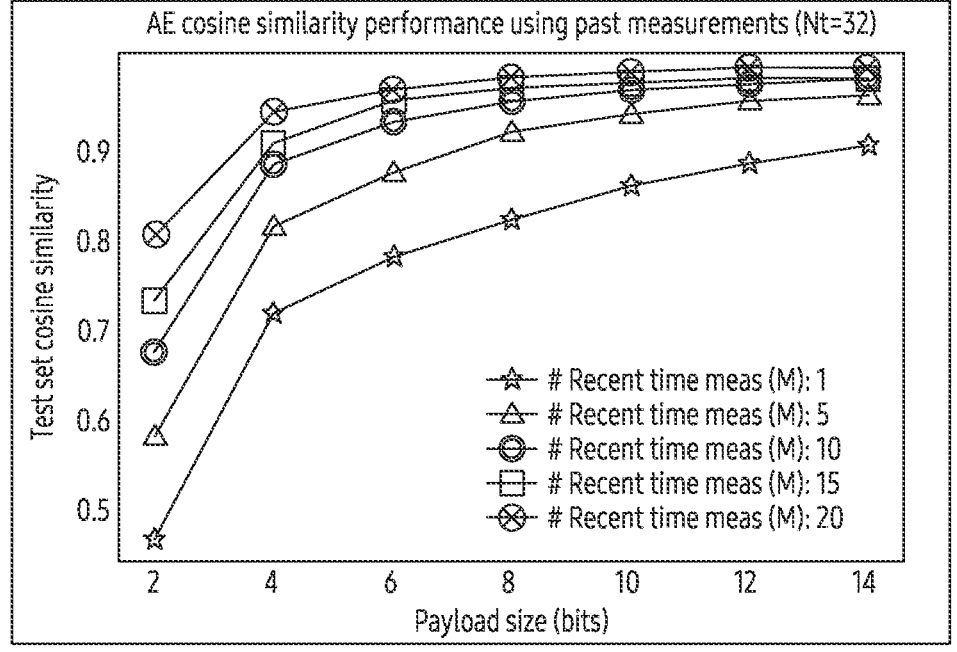
FIG. 15 is a graph illustrating similarity performance of the AI model considering the time measurements, according to various embodiments.

FIG. 15 is the graph illustrating cosine similarity performance of the AI model considering time measurements, according to various embodiments.

FIG. 15 shows the cosine similarity performance of the trained AI model along with y-axis for different number of reporting payload bits represented along x-axis. Higher the cosine similarity (CS), closer is the reconstructed precoder vector compared to the original precoder vector. Simulation results are shown for 32 transmission port configuration (Ntx=32). Note that the CS, hence the accuracy of the decoded precoding vector increases with the payload size shown in bits. For each number of M measurements considered, the CS at each payload size is higher for higher values of M. This is due to the AI model being able to exploit the channel correlation found in the time dimension. For example, using payload size of 2 bits, using M=20, results in 70% higher CS, hence reconstruction accuracy over to M=1.

Figure 16:
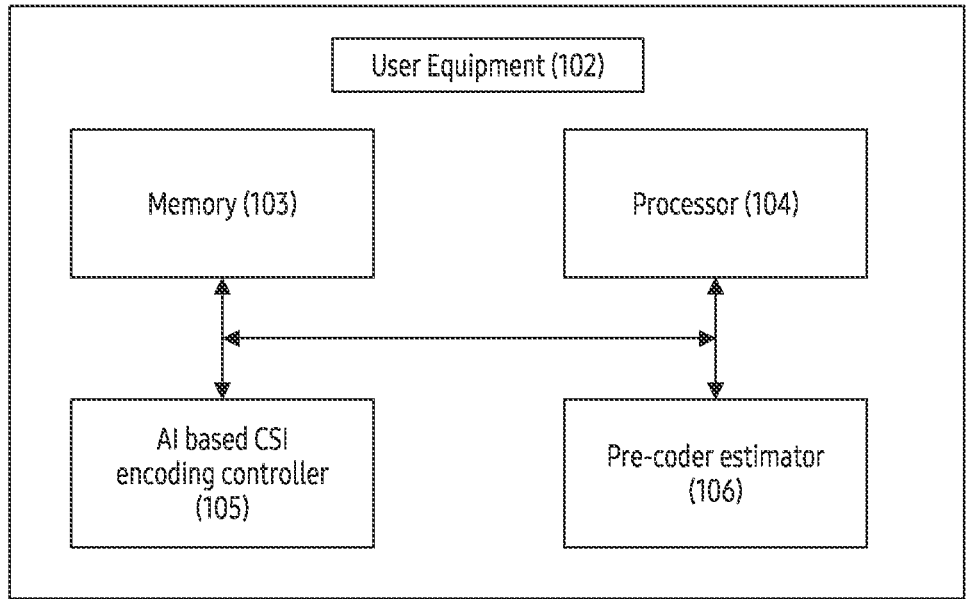
FIG. 16 is a block diagram illustrating an example configuration of a UE for CSI based coding, according to various embodiments.

FIG. 16 is a block diagram illustrating an example configuration of the UE (102) for AI based the CSI coding, according to embodiments disclosed herein. The UE (102) includes a memory (103), a processor (e.g., including processing circuitry) (104), the AI based CSI encoding controller (e.g., including processing and/or control circuitry and/or executable program instructions) (105), and the precoder estimator (e.g., including processing circuitry and/or executable program instructions) (106).

In an embodiment, the UE (102) comprises the memory (103) for storing instructions to be executed by the processor (104). The memory (103) may include non-volatile storage elements. Examples of such non-volatile storage elements may include magnetic hard discs, optical discs, floppy discs, flash memories, or forms of electrically programmable memories (EPROM) or electrically erasable and programmable (EPROM) memories. In addition, the memory (103)

may, in various examples, be considered a non-transitory storage medium. The term "non-transitory" may indicate that the storage medium is not embodied in a carrier wave or a propagated signal. However, the term "non-transitory" should not be interpreted that the memory (103) is non-movable. In various examples, the memory (103) can be configured to store larger amounts of information than the memory (103). In certain examples, a non-transitory storage medium may store data that can, over time, change (e.g., in Random Access Memory (RAM) or cache). The memory (103) can be an internal storage unit or it can be an external storage unit of the UE (102), a cloud storage, or any other type of external storage. The memory (103) of the UE (102) stores the encoding parameters received from the BS (101). The precoder data is collected from the memory (103) and processed at the AI based CSI encoding controller (105).

The processor (104) may include various processing circuitry and communicates with the memory (103), the AI based CSI encoding controller (105) and the precoder estimator (106). The processor (104) is configured to execute instructions stored in the memory (103) and to perform various processes. The processor (104) may include one or a plurality of processors, may be a general-purpose processor, such as a Central Processing Unit (CPU), an Application Processor (AP), or the like, a graphics-only processing unit such as a graphics processing unit (GPU), a visual processing unit (VPU), and/or an Artificial intelligence (AI) dedicated processor such as a Neural Processing Unit (NPU).

The AI based CSI encoding controller (105) is configured for communicating internally between internal hardware components such as the memory (203), a processor (204), the AI based CSI decoding controller (205) and the decoding model (206). The AI based CSI encoding controller (105) includes an electronic circuit specific to a standard that enables wired or wireless communication. The AI based CSI encoding controller in the UE (102) is configured to receive the signaling message. The precoder data is segmented into the data segments for encoding the data segments of the precoder. The pre-coded data is transmitted to the BS (101).

The precoder estimator (106) may include various circuitry and/or executable program instructions and estimates the precoder data to be selected for encoding. The precoder data is divided into the data segments and the AI model is selected based on the encoding parameters received from the BS (101).

Figure 17:
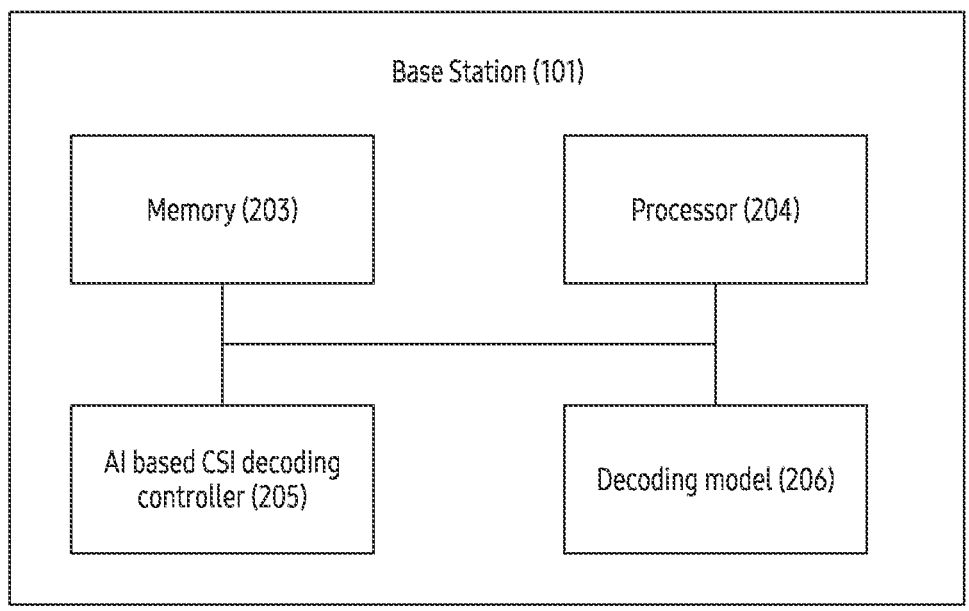
FIG. 17 is a block diagram illustrating an example configuration of the BS for CSI based coding, according to various embodiments.

FIG. 17 is a block diagram illustrating an example configuration of the BS (101) for AI based CSI decoding, according to various embodiments.

The BS (101) includes the memory (203), the processor (e.g., including processing circuitry) (204), the AI based CSI decoding controller (e.g., including processing and/or control circuitry and/or executable program instructions) (205) and the decoding model (e.g., including various processing circuitry and/or executable program instructions) (206).

In an embodiment, the BS (101) comprises the memory (203) for storing instructions to be executed by the processor (204). The memory (203) may include non-volatile storage elements. Examples of such non-volatile storage elements may include magnetic hard discs, optical discs, floppy discs, flash memories, or forms of electrically programmable memories (EPROM) or electrically erasable and programmable (EPROM) memories. In addition, the memory (203) may, in various examples, be considered a non-transitory storage medium. The term "non-transitory" may indicate that the storage medium is not embodied in a carrier wave or a propagated signal. However, the term "non-transitory" should not be interpreted that the memory (203) is non-movable. In various examples, the memory (203) can be configured to store larger amounts of information than the memory (203). In certain examples, a non-transitory storage medium may store data that can, over time, change (e.g., in Random Access Memory (RAM) or cache). The memory (203) can be an internal storage unit or it can be an external storage unit of the BS, a cloud storage, or any other type of external storage. The memory (203) of the BS (101) can store the decoding parameters received from the UE (102). The precoder data is collected from the memory (203) and processed at the AI based CSI decoding controller (205).

The processor (204) may include various processing circuitry and communicates with the memory (203), the AI based CSI decoding controller (205) and the decoding model (206). The processor (204) is configured to execute instructions stored in the memory (203) and to perform various processes. The processor (204) may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The AI based CSI decoding controller (205) may include various circuitry and/or executable program instructions and is configured for communicating internally between internal hardware components such as routers, access points, IoT devices. The decoding model (206) includes an electronic circuit specific to a standard that enables wired or wireless communication. The AI based CSI decoding controller (205) in the BS (101) is configured to determine the AI model to be used for decoding the precoder received from the UE (102). The precoder data is divided into the data segments for encoding the data segments of the precoder. The bit segments are decoded at the BS (101) using the decoding model (206).

Figure 18:
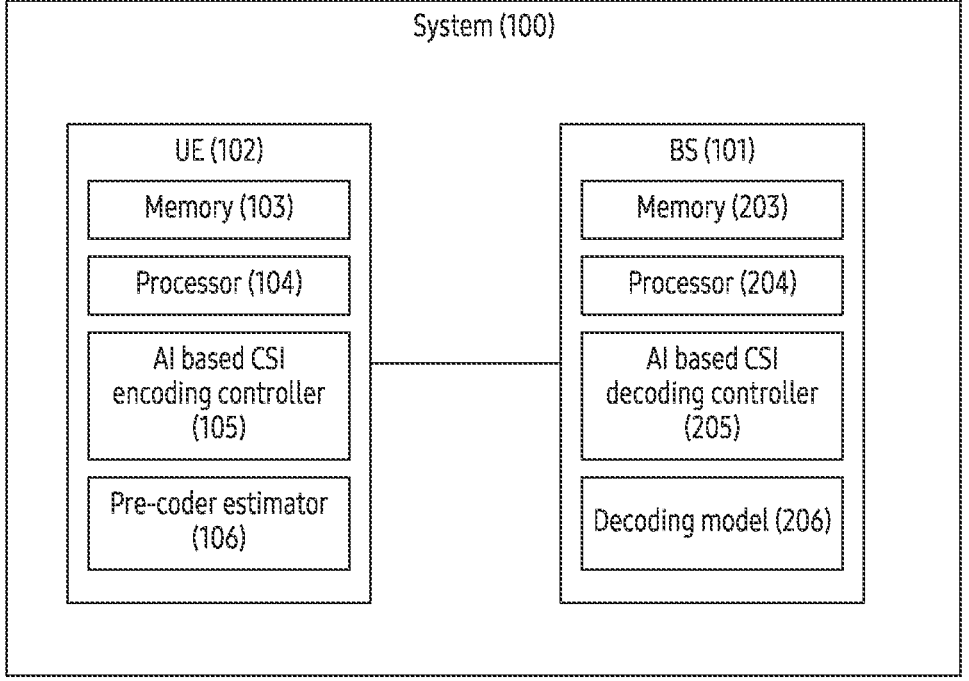
FIG. 18 is a block diagram illustrating an example configuration of a system for CSI based coding, according to various embodiments.

FIG. 18 is a block diagram illustrating an example configuration of a system (100) for AI based CSI decoding, according to various embodiments.

The system (100) includes the BS (101) and the UE (102). The UE (102) includes the memory (103), the processor (e.g., including processing circuitry) (104), the AI based CSI encoding controller (e.g., including various circuitry and/or executable program instructions) (105), and the precoder estimator (e.g., including various circuitry and/or executable program instructions) (106). The BS (101) includes the memory (203), the processor (e.g., including processing circuitry) (204), the AI based CSI decoding controller (e.g., including various circuitry and/or executable program instructions) (205) and the decoding model (e.g., including various circuitry and/or executable program instructions) (206).

The method discloses sending the signaling message with the encoding parameter to the UE (102). The UE (102) receives the signaling message with the encoding parameter from the BS (101) The precoder data is segmented into the plurality of data segments and the AI model is selected based on the encoding parameter received from the BS (101). The data segment of the precoder data using the selected AI model is encoded to send the encoded data segments to the BS (101). The BS (101) receives the data segments corresponding to the encoded precoder data from the UE (102) and selecting the AI model from the plurality of AI models based on the at least one encoding parameter sent to the UE (102). The encoded data segments are decoded corresponding to the precoder data using the selected AI model.

FIG. 19 is a flowchart illustrating example CSI based coding (1900), according to various embodiments.

At step 1902, a signaling message is received with encoding parameter from the BS (101). For example, the UE (102) receives the signaling message including at least one encoding parameter from the BS (101). The encoding parameter is the AI model indicator for selecting the AI model, the model download message for downloading the AI model, time measurements ($M_t$), frequency sub-band measurements ($M_b$). For example, the encoding parameter includes at least one of the AI model indicator for selecting the AI model, the model download message for downloading the AI model, time measurements ($M_t$), or frequency sub-band measurements ($M_b$).

At step 1904, a precoder data is segmented into data segments. For example, the UE (102) perform a segmentation of the precoder data into the data segments. The precoder data is encoded based on at least one of time measurement occasions, at least one frequency sub-band measurement, at least one time measurement in which each occasion comprises of CSI measured for at least one frequency sub-band, at least one AMI for selecting at least one AI model, or at least one AI model download information for downloading the at least one AI model.

At step 1906, AI model is selected based on the encoding parameter received from the BS (101). For example, the UE (102) selects the AI model based on the encoding parameter. The precoder data is encoded by the UE (102) using at least one of AI model based on at least one encoding parameter sent by the BS (101) or model download information sent by the BS (101), wherein the at least one AI model used to encode the precoder data by the UE (102) is different than the at least one AI model used to decode the encoded data segment corresponding to the precoder data by the BS (101), and wherein the model download information sent by the BS (101) comprises the at least one AI model to be used for encoding.

The encoding parameters (AMI) are received from the BS (101) and segmenting the precoder data into the plurality of data segments to encode each data segment of the precoder data using the selected mode. The encoded data is sent to the BS (101) for decoding.

At step 1908, each data segment of the precoder data is encoded using the selected AI model. For example, the UE (102) perform encoding the each data segment based on the selected AI model.

At step 1910, the encoded data segments corresponding to the precoder data is sent to the BS (101) for de-coding. For example, the UE (102) transmits the encoded data segments to the BS (101).

According to embodiments, a method for Artificial Intelligence (AI) based Channel State Information (CSI) coding, comprises receiving, by a User Equipment (UE), a signaling message with at least one encoding parameter from a Base Station (BS), wherein the encoding parameter comprises an AI model. The method comprises segmenting, by the UE, a precoder data based on the signaling message into a plurality of data segments. The method comprises selecting, by the UE, at least one AI model from a plurality of AI models based on the at least one encoding parameter received from the BS. The method comprises encoding, by the UE, each data segment of the plurality of data segments of the precoder data using the at least one selected AI model. The method comprises sending, by the UE, at least one encoded data segment corresponding to the precoder data to the BS for decoding.

In an embodiment, the at least one encoding parameter includes an AI model indicator (AMI) configured to select the at least one of AI model a model download message for downloading the at least one AI model, time measurements, frequency sub-band measurements.

In an embodiment, the receiving the at least one encoding parameter comprising the AMI comprises receiving, by the UE, the AMI from the BS. The receiving the at least one encoding parameter comprising the AMI comprises selecting, by the UE, the at least one AI model stored in the UE based on the AMI received from the BS. The receiving the at least one encoding parameter comprising the AMI comprises segmenting, by the UE, the precoder data into the plurality of data segments. The receiving the at least one encoding parameter comprising the AMI comprises encoding, by the UE, each data segment of the plurality of data segments of the precoder data using the selected at least one AI model. The receiving the at least one encoding parameter comprising the AMI comprises sending, by the UE, the at least one encoded data segments corresponding to the precoder data to the BS for decoding.

In an embodiment, the receiving the at least one encoding parameter comprising an AI model download information comprises receiving, by the UE, the AI model download information with the at least one encoding parameter from the BS. The receiving the at least one encoding parameter comprising an AI model download information comprises downloading, by the UE, the at least one AI model received from the BS based on the AI model download information. The receiving the at least one encoding parameter comprising an AI model download information comprises segmenting, by the UE, the precoder data into the plurality of data segments. The receiving the at least one encoding parameter comprising an AI model download information comprises encoding, by the UE, each data segment of the plurality of data segments of the precoder data using downloaded AI model based on the AI model download information. The receiving the at least one encoding parameter comprising an AI model download information comprises sending, by the UE, at least one of the encoded data segments corresponding to the precoder data to the BS for decoding.

In an embodiment, the precoder data is encoded based on at least one of time measurement occasions, at least one of frequency sub-band measurements, at least one time measurement in which each occasion comprises of CSI measured for at least one frequency sub-band, at least one of AMI for selecting at least one AI model, the AI model download information for downloading the at least one AI model.

In an embodiment, the CSI encoding comprises sending, by the BS, the signaling message with the at least one encoding parameter to the UE. The CSI encoding comprises receiving, by the BS, the plurality of data segments corresponding to the encoded precoder data from the UE. The CSI encoding comprises selecting, by the BS, at least one AI model from the plurality of AI models based on the at least one encoding parameter sent to the UE. The CSI encoding comprises decoding, by the BS, the at least one encoded data segments corresponding to the precoder data using at least one selected at least one AI mode.

In an embodiment, the precoder data is encoded by the UE using at least one of AI model based on the at least one encoding parameter sent by the BS or model download information sent by the BS, wherein the at least one AI model used to encode the precoder data by the UE is different than the at least one AI model used to decode the encoded data segment corresponding to the precoder data by the BS, and wherein the model download information sent by the BS comprises the at least one AI model to be used for encoding.

According to embodiments, a method for Artificial Intelligent (AI) based Channel State Information (CSI) coding, comprises sending, by a system, a signaling message with at least one encoding parameter to a UE, wherein the encoding parameter comprises an AI model. The method comprises receiving, by the system, the signaling message with the at least one encoding parameter from a Base Station (BS). The method comprises segmenting, by the system, a precoder data into a plurality of data segments. The method comprises selecting, by the system, at least one AI model from a plurality of AI models based on the at least one encoding parameter received from the BS. The method comprises encoding, by the system, each data segment of the plurality of data segments of the precoder data using the at least one selected AI model. The method comprises sending, by the system, the at least one encoded data segments corresponding to the precoder data to the BS for decoding. The method comprises receiving, by the system, the plurality of data segments corresponding to the encoded precoder data from the UE. The method comprises selecting, by the system, at least one AI model from the plurality of AI models based on the at least one encoding parameter sent to the UE. The method comprises decoding, by the system, the at least one encoded data segments corresponding to the precoder data using the at least one selected AI models.

According to embodiments, a User Equipment (UE) for Artificial Intelligent (AI) based Channel State Information (CSI) coding, the UE comprises a memory comprising a plurality of AI models and corresponding weight of each of the AI models. The UE comprises a processor. The UE comprises a AI based CSI encoding controller communicatively coupled to the memory and the processor. The AI based CSI encoding controller is configured to receive a signaling message with at least one encoding parameter from a Base Station (BS), wherein the encoding parameter comprises an AI model. The AI based CSI encoding controller is configured to segment a precoder data into a plurality of data segments. The AI based CSI encoding controller is configured to select at least one AI model from a plurality of AI models based on the at least one encoding parameter received from the BS. The AI based CSI encoding controller is configured to encode each data segment of the plurality of data segments of the precoder data using the at least one selected AI model. The AI based CSI encoding controller is configured to send the at least one encoded data segments corresponding to the precoder data to the BS for decoding.

In an embodiment, the at least one encoding parameter is an AI model indicator (AMI) configured to select the at least one AI model, a model download message for downloading the at least one AI model, time measurements, frequency sub-band measurements.

In an embodiment, the AI based CSI encoding controller is configured to receive the AMI from the BS. The AI based CSI encoding controller is configured to select the at least one AI model stored in the UE based on the AMI received from the BS. The AI based CSI encoding controller is configured to segment the precoder data into a plurality of data segments. The AI based CSI encoding controller is configured to encode each data segment of the plurality of data segments of the precoder data using the selected at least one AI model. The AI based CSI encoding controller is configured to send the at least one encoded data segments corresponding to the precoder data to the BS for decoding.

In an embodiment, the precoder data is encoded based on at least one of time measurement occasions, at least one of frequency sub-band measurements, at least one time measurement in which each occasion comprises of CSI measured for at least one frequency sub-band, at least one of AMI for selecting at least one AI model, at least one AI model download information for downloading the at least one AI model.

In an embodiment, the precoder data is encoded by the UE using at least one of AI model based on the at least one encoding parameter sent by the BS or model download information sent by the BS, wherein the at least one AI model used to encode the precoder data by the UE is different than the at least one AI model used to decode the encoded data segment corresponding to the precoder data by the BS, and wherein the model download information sent by the BS comprises the at least one AI model to be used for encoding.

According to embodiments, a Base Station (BS) for Artificial Intelligent (AI) based Channel State Information (CSI), the BS comprises a memory. The BS comprises a processor. The BS comprises a decoding model. The BS comprises an AI based CSI decoding controller and the decoding model communicatively coupled to the memory and the processor. The AI based CSI decoding controller and the decoding model is configured to send a signaling message with at least one encoding parameter to a UE, wherein the encoding parameter comprises an AI model. The AI based CSI decoding controller and the decoding model is configured to receive a plurality of data segments corresponding to an encoded precoder data from the UE. The AI based CSI decoding controller and the decoding model is configured to select at least one AI model from a plurality of AI models based on the at least one encoding parameter sent to the UE. The AI based CSI decoding controller and the decoding model is configured to decode the at least one encoded precoder data segments corresponding to the precoder data using the at least one selected AI model.

According to embodiments, a system for Artificial Intelligent (AI) based Channel State Information (CSI) coding, the system comprises a UE. The system comprises a BS communicatively coupled to the UE. The system is configured to send a signaling message with at least one encoding parameter to the UE, wherein the encoding parameter comprises an AI model. The system is configured to receive the signaling message with the at least one encoding parameter from the BS. The system is configured to segment a precoder data into a plurality of data segments. The system is configured to select at least one AI model from a plurality of AI models based on the at least one encoding parameter received from the BS. The system is configured to encode each data segment of the plurality of data segments of the precoder data using the at least one selected AI model. The system is configured to send at least one encoded data segments corresponding to the precoder data to the BS for decoding. The system is configured to receive the plurality of data segments corresponding to an encoded precoder data from the UE. The system is configured to select at least one AI model from the plurality of AI models based on the at least one encoding parameter sent to the UE. The system is configured to decode the at least one encoded data segments corresponding to the precoder data using the at least one selected at least one AI model.

According to embodiments, a method performed by a user equipment (UE) for Artificial Intelligence (AI) based Channel State Information (CSI) encoding, comprises receiving, a signaling message including at least one encoding parameter from a Base Station (BS), wherein the encoding parameter comprises an AI model. The method comprises segmenting a precoder data based on the signaling message into a plurality of data segments. The method comprises selecting at least one AI model from a plurality of AI models based on the at least one encoding parameter received from the BS. The method comprises encoding each data segment of the plurality of data segments of the precoder data using the at least one selected AI model. The method comprises sending at least one encoded data segment of the precoder data to the BS for decoding.

In an embodiment, the at least one encoding parameter includes an AI model indicator (AMI) for selecting the at least one of AI model or a model download message for downloading the at least one AI model.

In an embodiment, the at least one AI model is selected among the plurality of AI models based on the AMI in response to the at least one encoding parameter including the AMI.

In an embodiment, the method comprises downloading the at least one AI model received from the BS based on the model download information in response to the at least one encoding parameter including the model download message for downloading the at least one AI model.

In an embodiment, the at least one encoding parameter further includes at least one of time measurements or frequency sub-band measurements.

In an embodiment, the precoder data is encoded based on at least one of time measurement occasions, at least one frequency sub-band measurement, at least one time measurement in which each occasion comprises of CSI measured for at least one frequency sub-band, at least one AMI for selecting at least one AI model, or the AI model download information for downloading the at least one AI model.

In an embodiment, the at least encoded data segment of the precoder data is decoded by the BS based on at least one of at least one frequency sub-band measurement, at least one time measurement in which each occasion comprises of CSI measured for at least one frequency sub-band, at least one AMI for selecting at least one AI model, or the AI model download information for downloading the at least one AI model.

According to embodiments, a User Equipment (UE) for Artificial Intelligent (AI) based Channel State Information (CSI) encoding, the UE comprises a memory comprising a plurality of AI models and corresponding weight of each of the plurality of AI models. The UE comprises a processor. The processor is configured to receive a signaling message including at least one encoding parameter from a Base Station (BS), wherein the encoding parameter comprises an AI model. The processor is configured to segment a precoder data into a plurality of data segments. The processor is configured to select at least one AI model from a plurality of AI models based on the at least one encoding parameter received from the BS. The processor is configured to encode each data segment of the plurality of data segments of the precoder data using the at least one selected AI model. The processor is configured to send the at least one encoded data segments of the precoder data to the BS for decoding.

In an embodiment, the at least one encoding parameter includes an AI model indicator (AMI) for selecting the at least one of AI model or a model download message for downloading the at least one AI model.

In an embodiment, the at least one AI model is selected among the plurality of AI models based on the AMI in response to the at least one encoding parameter including the AMI.

In an embodiment, the processor is further configured to: download the at least one AI model received from the BS based on the model download information in response to the at least one encoding parameter including the model download message for downloading the at least one AI model.

In an embodiment, the at least one encoding parameter further includes at least one of time measurements or frequency sub-band measurements.

In an embodiment, the precoder data is encoded based on at least one of time measurement occasions, at least one frequency sub-band measurement, at least one time measurement in which each occasion comprises of CSI measured for at least one frequency sub-band, at least one AMI for selecting at least one AI model, or the AI model download information for downloading the at least one AI model.

In an embodiment, the at least encoded data segment of the precoder data is decoded by the BS based on at least one of at least one frequency sub-band measurement, at least one time measurement in which each occasion comprises of CSI measured for at least one frequency sub-band, at least one AMI for selecting at least one AI model, or the AI model download information for downloading the at least one AI model.

According to embodiments, a Base Station (BS) for Artificial Intelligent (AI) based Channel State Information (CSI), the BS comprises a memory. The BS comprises a processor. The processor is configured to send a signaling message including at least one encoding parameter to a user equipment (UE), wherein the encoding parameter comprises an AI model. The processor is configured to receive at least one data segment of a precoder data from the UE. The processor is configured to select at least one AI model from a plurality of AI models based on the at least one encoding parameter. The processor is configured to decode the at least one data segments of the precoder data using the at least one selected AI model.

In an embodiment, the at least one encoding parameter is an AI model indicator (AMI) for selecting the at least one AI model or a model download message for downloading the at least one AI model.

In an embodiment, the at least one AI model is selected among the plurality of AI models based on the AMI or the model download message for downloading the at least one AI model in the UE.

In an embodiment, the at least one encoding parameter further includes at least one of time measurements or frequency sub-band measurements.

In an embodiment, the precoder data is encoded by the UE based on at least one of time measurement occasions, at least one frequency sub-band measurement, at least one time measurement in which each occasion comprises of CSI measured for at least one frequency sub-band, at least one AMI for selecting at least one AI model, or at least one AI model download information for downloading the at least one AI model.

In an embodiment, the at least encoded data segment of the precoder data is decoded based on at least one of at least one frequency sub-band measurement, at least one time measurement in which each occasion comprises of CSI measured for at least one frequency sub-band, at least one AMI for selecting at least one AI model, or the AI model download information for downloading the at least one AI model.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a user equipment (UE) for artificial intelligence (AI) based channel state information (CSI) encoding, comprising:
   receiving, a signaling message including at least one encoding parameter from a base station (BS), wherein the at least one encoding parameter comprises an AI model indicator (AMI);
   segmenting a precoder data based on the signaling message into a plurality of data segments;
   selecting at least one AI model from a plurality of AI models based on the at least one encoding parameter received from the BS;
   encoding each data segment of the plurality of data segments of the precoder data using the at least one selected AI model; and
   sending at least one encoded data segment of the precoder data to the BS for decoding.

2. The method of claim 1, wherein the at least one AI model is selected among the plurality of AI models based on the AMI in response to the at least one encoding parameter including the AMI.

3. The method of claim 1, wherein the at least one encoding parameter further includes at least one of time measurements or frequency sub-band measurements.

4. The method of claim 1, wherein the precoder data is encoded based on at least one of time measurement occasions, at least one frequency sub-band measurement, at least one time measurement in which each occasion comprises of CSI measured for at least one frequency sub-band, or the AMI for selecting at least one AI model.

5. The method of claim 1, wherein the at least one encoded data segment of the precoder data is decoded by the BS based on at least one of at least one frequency sub-band measurement, at least one time measurement in which each occasion comprises of CSI measured for at least one frequency sub-band, or the AMI for selecting at least one AI model.

6. A user equipment (UE) for artificial intelligent (AI) based channel state information (CSI) encoding, the UE comprising:
   memory comprising a plurality of AI models and corresponding weight of each of the plurality of AI models;
   a processor; and
   wherein the processor is configured to:
   receive a signaling message including at least one encoding parameter from a base station (BS), wherein the at least one encoding parameter comprises an AI model indicator (AMI);
   segment a precoder data into a plurality of data segments;
   select at least one AI model from a plurality of AI models based on the at least one encoding parameter received from the BS;

encode each data segment of the plurality of data segments of the precoder data using the at least one selected AI model; and send the at least one encoded data segments of the precoder data to the BS for decoding.

7. The UE of claim 6, wherein the at least one AI model is selected among the plurality of AI models based on the AMI in response to the at least one encoding parameter including the AMI.

8. The UE of claim 6, wherein the at least one encoding parameter further includes at least one of time measurements or frequency sub-band measurements.

9. The UE of claim 6, wherein the precoder data is encoded based on at least one of time measurement occasions, at least one frequency sub-band measurement, at least one time measurement in which each occasion comprises of CSI measured for at least one frequency sub-band, or the AMI for selecting at least one AI model.

10. The UE of claim 6, wherein the at least one encoded data segment of the precoder data is decoded by the BS based on at least one of at least one frequency sub-band measurement, at least one time measurement in which each occasion comprises of CSI measured for at least one frequency sub-band, or the AMI for selecting at least one AI model.

11. A base station (BS) for artificial intelligent (AI) based channel state information (CSI), the BS comprising:

a memory;

a processor; and wherein the processor is configured to:

send a signaling message including at least one encoding parameter to a user equipment (UE), wherein the at least one encoding parameter comprises an AI model indicator (AMI);

receive at least one data segment of a precoder data from the UE;

select at least one AI model from a plurality of AI models based on the at least one encoding parameter; and decode the at least one data segments of the precoder data using the at least one selected AI model.

12. The BS of claim 11, wherein the at least one AI model is selected among the plurality of AI models based on the AMI.

13. The BS of claim 11, wherein the at least one encoding parameter further includes at least one of time measurements or frequency sub-band measurements.

14. The BS of claim 11, wherein the precoder data is encoded by the UE based on at least one of time measurement occasions, at least one frequency sub-band measurement, at least one time measurement in which each occasion comprises of CSI measured for at least one frequency sub-band, or the AMI for selecting at least one AI model.

15. The BS of claim 11, wherein the at least one encoded data segment of the precoder data is decoded based on at least one of at least one frequency sub-band measurement, at least one time measurement in which each occasion comprises of CSI measured for at least one frequency sub-band, or the AMI for selecting at least one AI model.

* * * * *